US012696161B2

(12) United States Patent
Fujishiro et al.

(10) Patent No.: US 12,696,161 B2
(45) Date of Patent: Jul. 28, 2026

(54) COMMUNICATION CONTROL METHOD

(71) Applicant: KYOCERA Corporation, Kyoto (JP)

(72) Inventors: Masato Fujishiro, Yokohama (JP);
Henry Chang, San Diego, CA (US)

(73) Assignee: KYOCERA Corporation, Kyoto (JP)

( * ) Notice: Subject to any disclaimer, the term of this
patent is extended or adjusted under 35
U.S.C. 154(b) by 436 days.

(21) Appl. No.: 17/483,248

(22) Filed: Sep. 23, 2021

(65) Prior Publication Data

US 2022/0015000 A1     Jan. 13, 2022

Related U.S. Application Data

(63) Continuation of application No.
PCT/JP2020/012148, filed on Mar. 18, 2020.
(Continued)

(51) Int. Cl.
*H04W 36/30* (2009.01)
*H04W 36/36* (2009.01)
*H04W 84/04* (2009.01)

(52) U.S. Cl.
CPC ....... *H04W 36/305* (2018.08); *H04W 36/362*
(2023.05); *H04W 84/047* (2013.01)

(58) Field of Classification Search
CPC ............. H04W 36/08; H04W 36/0055; H04W
84/047; H04W 36/00837; H04W 36/0033;
H04W 88/085; H04W 72/04; H04W
48/20; H04W 36/0005; H04W 36/0069;
H04W 36/0077; H04W 36/0061; H04W
36/0072; H04W 36/0079; H04W 36/0085;
H04W 36/0088; H04W 36/18; H04W
36/10; H04W 36/023
See application file for complete search history.

(56) References Cited

U.S. PATENT DOCUMENTS

2014/0153423 A1*  6/2014  Shin ................... H04W 36/304
                                                      370/252
2020/0252847 A1*  8/2020  Park ..................... H04W 76/27
                        (Continued)

FOREIGN PATENT DOCUMENTS

WO     WO-2018144758 A1 *  8/2018  ............ H04W 36/00

OTHER PUBLICATIONS

LG Electronic Inc., "BH RLF reporting to IAB doner node", 3GPP
TSG-RAN WG2 Meeting #105, R2-1902018; Feb. 25-Mar. 1, 2019;
pp. 1-4; Athens, Greece.

(Continued)

*Primary Examiner* — Khalid W Shaheed
(74) *Attorney, Agent, or Firm* — Studebaker Brackett
PLLC

(57)     ABSTRACT

A communication control method according to the first
aspect is a method of using a relay apparatus configured to
relay communication between an upper apparatus and a
lower apparatus by radio. The communication control
method includes a step of, in the relay apparatus, reporting,
by a user equipment function unit connecting to the upper
apparatus by radio, state information to a base station
function unit connecting to the lower apparatus by radio.
The state information is information indicating at least one
state of an RRC state of the user equipment function unit or
a radio link state between the upper apparatus and the user
equipment function unit.

6 Claims, 18 Drawing Sheets

Related U.S. Application Data

(60) Provisional application No. 62/825,149, filed on Mar. 28, 2019.

(56) References Cited

U.S. PATENT DOCUMENTS

2021/0345211 A1* 11/2021 Keskitalo ........ H04W 36/00725
2021/0360496 A1* 11/2021 Ishii ................... H04W 36/362

OTHER PUBLICATIONS

Qualcomm Incorporated, "Backhaul RLF notification for IAB", 3GPP TSG-RAN WG2 Meeting #105; R2-1900812; Feb. 15-Mar. 1, 2018; pp. 1-5; Athens, Greece.
ZTE, Sanechips, "Discussion on LAB BH RLF handling", 3GPP TSG RAN Meeting #105; R2-1900571; Feb. 25-Mar. 1, 2019; pp. 1-8; Athens, Greece.
AT&T, "Motivation for Study on Integrated Access and Backhaul for NR", 3GPP RAN#75; RP-170217; Mar. 6-9, 2017; pp. 1-8; Dubrovnik, Croatia.
Kyocera; "Consideration of topology adaptation upon BH RLF"; 3GPP TSG-RAN WG2 #105, R2-1900919; Feb. 25-Mar. 1, 2019, total 6 pages, Athens, Greece.

* cited by examiner

| IAB NODE | DONOR CANDIDATE 1 | DONOR CANDIDATE 2 | DONOR CANDIDATE 3 | DONOR CANDIDATE 4 |
|---|---|---|---|---|
| IAB NODE #1 | gNB#1 | gNB#2 | gNB#3 | – |
| IAB NODE #2 | gNB#1 | gNB#3 | – | – |
| IAB NODE #3 | gNB#1 | gNB#4 | gNB#5 | gNB#6 |

FIG. 7

COMMUNICATION CONTROL METHOD

RELATED APPLICATIONS

The present application is a continuation based on PCT Application No. PCT/JP2020/012148, filed on Mar. 18, 2020, which claims the benefit of U.S. Provisional Patent Application No. 62/825,149 filed on Mar. 28, 2019. The content of which is incorporated by reference herein in their entirety.

TECHNICAL FIELD

The present disclosure relates to a communication control method used in a mobile communication system.

BACKGROUND ART

In the 3rd Generation Partnership Project (3GPP), which is a standardization project for mobile communication systems, a new relay apparatus referred to as an Integrated Access and Backhaul (IAB) node has been under study. One or a plurality of relay apparatuses are involved in communication between a base station and user equipment, and perform relay for the communication. The relay apparatus includes a user equipment function and a base station function, and performs radio communication with an upper node (the base station or an upper relay apparatus) by using the user equipment function and performs radio communication with a lower node (the user equipment or a lower relay apparatus) by using the base station function.

A radio section between the user equipment and the relay apparatus or the base station may be referred to as an access link. A radio section between the relay apparatus and the base station or another relay apparatus may be referred to as a backhaul link. The 3GPP Contribution "RP-170217" describes a method of dynamically switching data transfer paths by integrating and multiplexing data communication in the access link and data communication in the backhaul link in Layer 2 and dynamically allocating radio resources to the backhaul link.

SUMMARY OF INVENTION

A communication control method according to the first aspect is a method of using a relay apparatus configured to relay communication between an upper apparatus and a lower apparatus by radio. The communication control method includes, in the relay apparatus, reporting, by a user equipment function unit connecting to the upper apparatus by radio, state information to a base station function unit connecting to the lower apparatus by radio. The state information is information indicating at least one state of an RRC state of the user equipment function unit or a radio link state between the upper apparatus and the user equipment function unit.

A communication control method according to the second aspect is a method of using a relay apparatus configured to relay communication between an upper apparatus and a lower apparatus by radio. The communication control method includes, in the relay apparatus, reporting, by a base station function unit connecting to the lower apparatus by radio, state information to a user equipment function unit connecting to the upper apparatus by radio or to a communication function unit communicating with a donor apparatus via the upper apparatus. The state information is information indicating a radio link state between the base station function unit and the lower apparatus.

A communication control method according to the third aspect is a method of using a relay apparatus configured to relay communication between an upper apparatus and a lower apparatus by radio. The communication control method includes, receiving, by the relay apparatus, a notification indicating occurrence of a radio link failure with another relay apparatus from the lower apparatus connecting to the relay apparatus, and transmitting, by the relay apparatus, a message related to the radio link failure to a donor apparatus.

BRIEF DESCRIPTION OF DRAWINGS

FIG. 7 is a diagram illustrating an example of a table for determining a context transfer destination according to the first embodiment.

DESCRIPTION OF EMBODIMENTS

A mobile communication system according to each embodiment will be described with reference to the drawings. In the following description regarding the drawings, the same or similar parts are denoted by the same or similar reference signs.

First Embodiment

Configuration of Mobile Communication System

Figure 1:
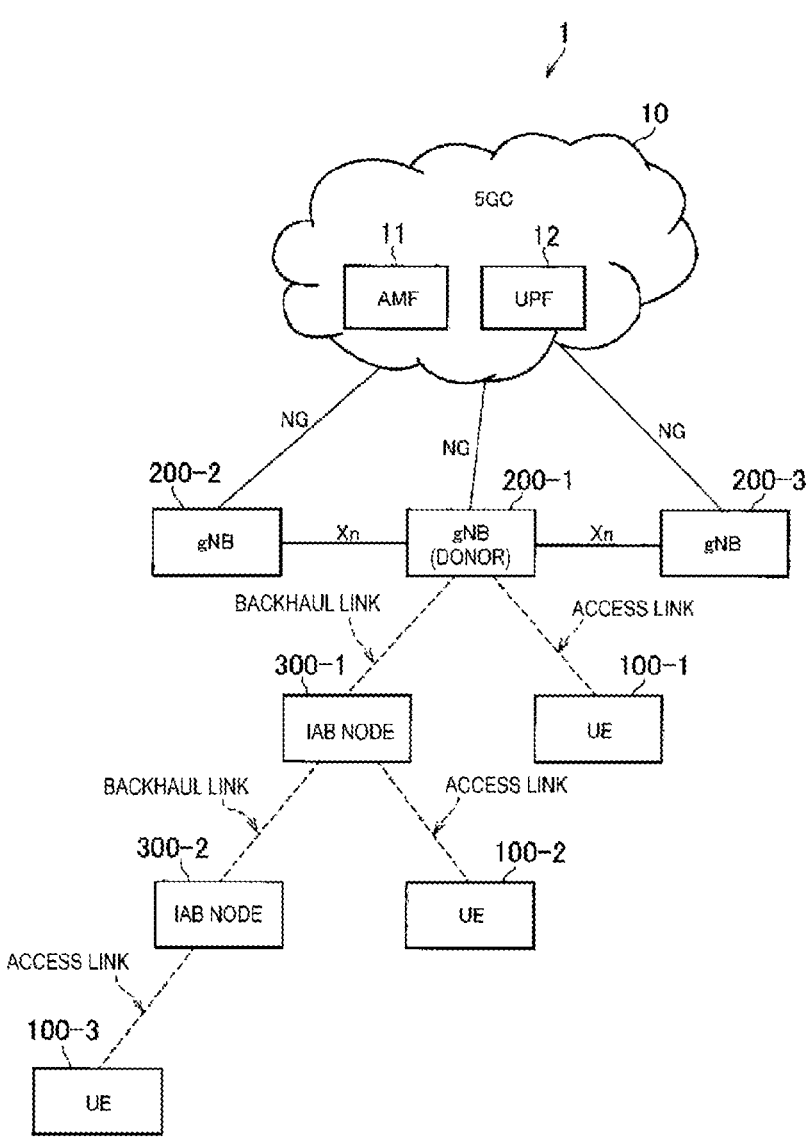
FIG. 1 is a diagram illustrating a configuration of a mobile communication system according to an embodiment.

A configuration of a mobile communication system according to the present embodiment will be described. FIG. 1 is a diagram illustrating a configuration of a mobile communication system 1 according to the present embodiment. The mobile communication system 1 is a fifth generation (5G) mobile communication system based on the 3GPP standard. Specifically, a radio access scheme in the mobile communication system 1 is New Radio (NR) being a radio access scheme of 5G. Note that Long Term Evolution (LTE) may be at least partially applied to the mobile communication system 1.

As illustrated in FIG. 1, the mobile communication system 1 includes a 5G core network (5GC) 10, user equipment (UE) 100, a base station (referred to as a gNB) 200, and an IAB node 300. The present embodiment mainly describes an example in which the base station is an NR base station. However, the base station may be an LTE base station (specifically, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

The gNB 200 is connected to the 5GC 10 via an interface referred to as an NG interface. FIG. 1 illustrates an example of three gNB 200-1 to gNB 200-3 that are connected to the 5GC 10. The gNB 200 is a fixed radio communication apparatus that performs radio communication with the UE 100. When the gNB 200 has a donor function, the gNB 200 may perform radio communication with the IAB node that is connected to the gNB 200 by radio.

The gNB 200 is connected to another neighboring gNB 200 via an inter-base station interface referred to as an Xn interface. FIG. 1 illustrates an example in which the gNB 200-1 is connected to the gNB 200-2 and the gNB 200-3.

Each gNB 200 manages one or a plurality of cells. The cell is used as a term denoting a minimum unit of a radio communication area. The cell may be used as a term denoting a function or a resource for performing radio communication with the UE 100. One cell belongs to one carrier frequency.

The UE 100 is a mobile radio communication apparatus that can perform radio communication with the gNB 200. The UE 100 may perform radio communication with the IAB node 300. The UE 100 may be any type of apparatus as long as the UE 100 is an apparatus that performs radio communication with the gNB 200 or the IAB node 300. For example, the UE 100 is a mobile phone terminal, a tablet terminal, a laptop PC, a sensor, an apparatus that is provided in a sensor, a vehicle, or an apparatus that is provided in a vehicle.

FIG. 1 illustrates an example in which UE 100-1 is connected to the gNB 200-1 by radio, UE 100-2 is connected to an IAB node 300-1 by radio, and UE 100-3 is connected to an IAB node 300-2 by radio. The UE 100-1 directly performs communication with the gNB 200-1. The UE 100-2 indirectly performs communication with the gNB 200-1 via the IAB node 300-1. The UE 100-3 indirectly performs communication with the gNB 200-1 via the IAB node 300-1 and the IAB node 300-2.

The IAB node 300 is an apparatus (relay apparatus) that is involved in communication between the eNB 200 and the UE 100, and performs relay for the communication. FIG. 1 illustrates an example in which the IAB node 300-1 is connected to the gNB 200-1 being a donor by radio, and the IAB node 300-2 is connected to the IAB node 300-1 by radio. Each IAB node 300 manages a cell. A cell ID of the cell managed by the IAB node 300 may be the same as or different from a cell ID of the cell of the donor gNB 200-1.

The IAB node 300 has a UE function (user equipment function) and a gNB function (base station function). The IAB node 300 performs radio communication with an upper node (the gNB 200 or an upper IAB node 300) by using the UE function, and performs radio communication with a lower node (the UE 100 or a lower IAB node 300) by using the gNB function. Note that the UE function refers to at least a part of the functions of the UE 100, and the IAB node 300 need not necessarily have all of the functions of the UE 100. The gNB function refers to at least a part of the functions of the gNB 200, and the IAB node 300 need not necessarily have all of the functions of the gNB 200.

A radio section between the UE 100 and the IAB node 300 or the gNB 200 may be referred to as an access link (or, Uu). A radio section between the IAB node 300 and the gNB 200 or another IAB node 300 may be referred to as a backhaul link (or, Un). The backhaul link may be referred to as a fronthaul link.

Data communication in the access link and data communication in the backhaul link can be integrated and multiplexed in Layer 2, radio resources can be dynamically allocated to the data communication in the backhaul link, and paths of relay can be dynamically switched. Note that, for the access link and the backhaul link, millimeter wave bands may be used. The access link and the backhaul link may be multiplexed by means of time division multiplexing and/or frequency division multiplexing.

Configuration of gNB

Figure 2:
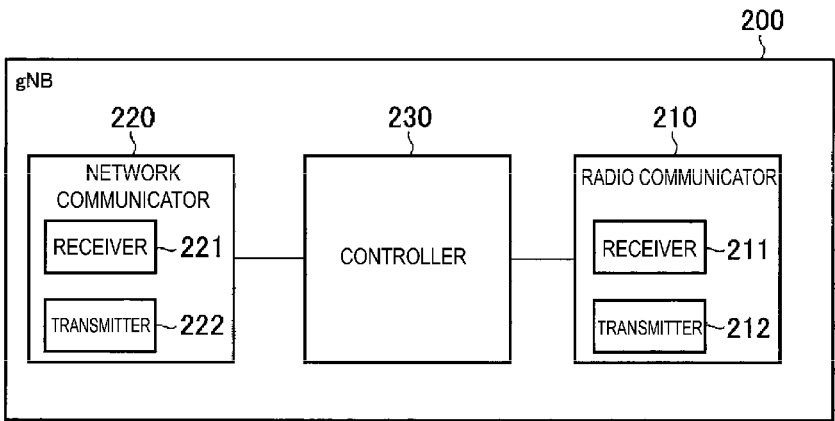
FIG. 2 is a diagram illustrating a configuration of a base station (gNB) according to the embodiment.

A configuration of the gNB 200 according to the present embodiment will be described. FIG. 2 is a diagram illustrating a configuration of the gNB 200. As illustrated in FIG. 2, the gNB 200 includes a radio communicator 210, a network communicator 220, and a controller 230.

The radio communicator 210 is used for radio communication with the UE 100 and radio communication with the IAB node 300. The radio communicator 210 includes a receiver 211 and a transmitter 212. The receiver 211 performs various types of reception while being controlled by the controller 230. The receiver 211 includes an antenna, and converts a radio signal received by the antenna into a baseband signal (received signal) and outputs the baseband signal to the controller 230. The transmitter 212 performs various types of transmission while being controlled by the controller 230. The transmitter 212 includes an antenna, and converts a baseband signal (transmission signal) to be output by the controller 230 into a radio signal and transmits the radio signal from the antenna.

The network communicator 220 is used for wired communication (or radio communication) with the 5GC 10 and wired communication (or radio communication) with another neighboring gNB 200. The network communicator 220 includes a receiver 221 and a transmitter 222. The receiver 221 performs various types of reception while being controlled by the controller 230. The receiver 221 receives a signal from the outside and outputs the received signal to the controller 230. The transmitter 222 performs various types of transmission while being controlled by the controller 230. The transmitter 222 transmits a transmission signal output by the controller 230 to the outside.

The controller 230 performs various types of control in the gNB 200. The controller 230 includes at least one processor and at least one memory. The memory stores a program to be executed by the processor, and information to be used for processing performed by the processor. The processor may include a baseband processor and a Central Processing Unit (CPU). The baseband processor performs, for example, modulation, demodulation and coding and decoding of the baseband signal. The CPU performs various types of processing by executing the program stored in the memory. The processor executes processing to be described later.

Configuration of IAB Node

Figure 3:
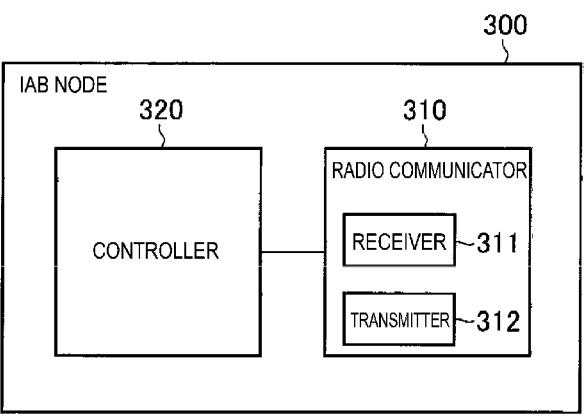
FIG. 3 is a diagram illustrating a configuration of a relay apparatus (IAB node) according to the embodiment.

A configuration of the IAB node 300 according to the present embodiment will be described. FIG. 3 is a diagram illustrating a configuration of the IAB node 300. As illustrated in FIG. 3, the IAB node 300 includes a radio communicator 310 and a controller 320.

The radio communicator 310 is used for radio communication (backhaul link) with the gNB 200 and radio communication (access link) with the UE 100. The radio communicator 310 includes a receiver 311 and a transmitter 312. The receiver 311 performs various types of reception while being controlled by the controller 320. The receiver 311 includes an antenna, and converts a radio signal received by the antenna into a baseband signal (received signal) and outputs the baseband signal to the controller 320. The transmitter 312 performs various types of transmission while being controlled by the controller 320. The transmitter 312 includes an antenna, and converts a baseband signal (transmission signal) to be output by the controller 320 into a radio signal and transmits the radio signal from the antenna.

The controller 320 performs various types of control in the IAB node 300. The controller 320 includes at least one processor and at least one memory. The memory stores a program to be executed by the processor, and information to be used for processing performed by the processor. The processor may include a baseband processor and a CPU. The baseband processor performs, for example, modulation, demodulation and coding and decoding of the baseband signal. The CPU performs various types of processing by executing the program stored in the memory. The processor executes processing to be described later.

Configuration of UE

Figure 4:
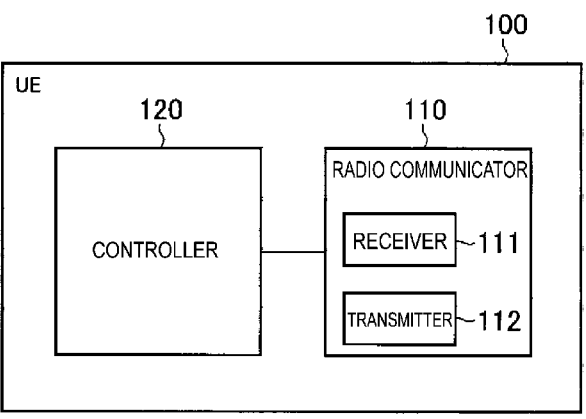
FIG. 4 is a diagram illustrating a configuration of user equipment (UE) according to the embodiment.

A configuration of the UE 100 according to the present embodiment will be described. FIG. 4 is a diagram illustrating a configuration of the UE 100. As illustrated in FIG. 4, the UE 100 includes a radio communicator 110 and a controller 120.

The radio communicator 110 is used for radio communication in the access link, specifically, radio communication with the gNB 200 and radio communication with the IAB node 300. The radio communicator 110 includes a receiver 111 and a transmitter 112. The receiver 111 performs various types of reception while being controlled by the controller 120. The receiver 111 includes an antenna, and converts a radio signal received by the antenna into a baseband signal (received signal) and outputs the baseband signal to the controller 120. The transmitter 112 performs various types of transmission while being controlled by the controller 120. The transmitter 112 includes an antenna, and converts a baseband signal (transmission signal) to be output by the controller 120 into a radio signal and transmits the radio signal from the antenna.

The controller 120 performs various types of control in the UE 100. The controller 120 includes at least one processor and at least one memory. The memory stores a program to be executed by the processor, and information to be used for processing performed by the processor. The processor may include a baseband processor and a CPU. The baseband processor performs, for example, modulation, demodulation and coding and decoding of the baseband signal. The CPU performs various types of processing by executing the program stored in the memory. The processor executes processing to be described later.

Example of Protocol Stack Configuration

Figure 5:
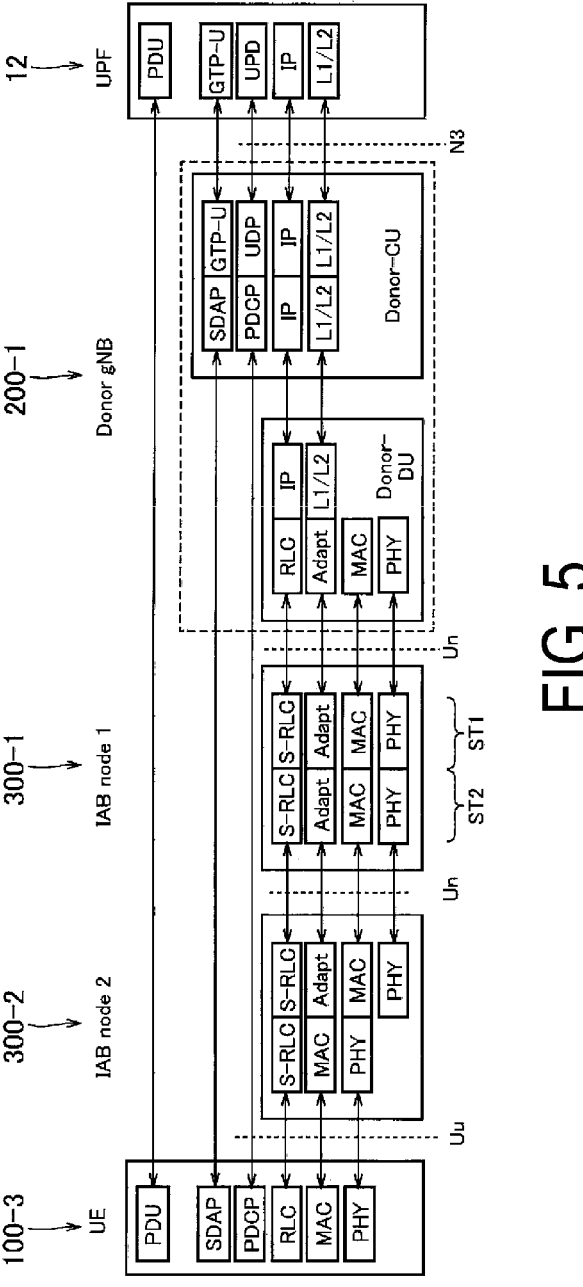
FIG. 5 is a diagram illustrating an example of a protocol stack configuration of a user plane in the mobile communication system according to the embodiment.

An example of a protocol stack configuration in the mobile communication system 1 according to the present embodiment will be described. FIG. 5 is a diagram illustrating an example of a protocol stack configuration of the user plane. Here, an example of a protocol stack configuration related to user data transmission between the UE 100-3 and the UPF 12 of the 5GC 10 illustrated in FIG. 1 will be described.

As illustrated in FIG. 5, the UPF 12 includes a GPRS Tunneling Protocol for User Plane (GTP-U), a User Datagram Protocol (UDP), an Internet Protocol (IP), and a Layer 1/Layer 2 (L1/L2). The gNB 200-1 (donor gNB) is provided with a protocol stack corresponding to these.

The gNB 200-1 includes a central unit (CU) and a distributed unit (DU). Of the protocol stack of the radio interface, the CU includes layers at and upper than a Packet Data Convergence Protocol (PDCP), and the DU includes layers at and lower than a Radio Link Control (RLC). The CU and the DU are connected via an interface referred to as an F1 interface.

Specifically, the CU includes a Service Data Adaptation Protocol (SDAP), a PDCP, an IP, and an L1/L2. The SDAP and the PDCP of the CU perform communication with the SDAP and the PDCP of the UE 100 via the DU, the IAB node 300-1, and the IAB node 300-2.

Of the protocol stack of the radio interface, the DU includes an RLC, an adaptation layer (Adapt), a Medium Access Control (MAC), and a Physical layer (PHY). These protocol stacks are protocol stacks for the gNB. Note that the upper/lower relationship between the adaptation layer and the RLC (S-RLC) may be inverted.

In the IAB node 300-1, a protocol stack ST1 for the UE corresponding to these is provided. In addition, in the IAB node 300-1, a protocol stack ST2 for the gNB is provided. Each of the protocol stack ST1 and the protocol stack ST2 includes layers (sub-layers) at or lower than Layer 2. Specifically, the IAB node 300-1 is a Layer 2 relay apparatus that performs relay of user data by using the layers at or lower than Layer 2. The IAB node 300-1 performs relay of data without using layers at or upper than Layer 3 (specifically, layers at or upper than the PDCP). Note that the IAB node 300-2 includes a protocol stack configuration similar to that of the IAB node 300-1.

The protocol stack configuration in the user plane has been described above. However, in the control plane, each of the gNB 200-1, the IAB node 300-1, the IAB node 300-2, and the UE 100-3 includes a Radio Resource Control (RRC) corresponding to Layer 3.

RRC connection is established between the RRC of the gNB 200-1 (donor gNB) and the RRC of the IAB node 300-1, and an RRC message is transmitted and received using the RRC connection. RRC connection is established between the RRC of the gNB 200-1 and the RRC of the IAB node 300-2, and an RRC message is transmitted and received using the RRC connection. In addition, RRC connection is established between the RRC of the gNB 200-1 and the RRC of the UE 100-3, and an RRC message is transmitted and received using the RRC connection.

Operation in Mobile Communication System

Operation in the mobile communication system 1 according to the present embodiment will be described. Specifically, operation of a case in which the IAB node 300-1 is connected to the gNB 200-1 (donor gNB) by radio will be described.

In such a case, the IAB node 300-1 first establishes access link connection (first radio connection) with the gNB 200-1 by using the UE function. In other words, the IAB node 300-1 establishes access link connection with the gNB 200-1 by operating as the UE 100. The establishment of the access link connection includes establishment of RRC connection.

Next, while maintaining the access link connection, the gNB 200-1 transmits, to the IAB node 300-1, a message for establishing backhaul link connection (second radio connection) for the gNB function of the IAB node 300-1 between the IAB node 300-1 and the gNB 200-1. In the present embodiment, the message is an RRC reconfiguration message that is transmitted and received using RRC connection.

As a result, the backhaul link connection is established between the IAB node 300-1 and the gNB 200-1, and thus communication in the backhaul link can be appropriately started between the IAB node 300-1 and the gNB 200-1.

The RRC reconfiguration message for establishing the backhaul link connection may include configuration information of a bearer (or L2 link) constituting the backhaul link connection, and a cell ID that is to be transmitted by the IAB node 300-1 (specifically, transmission configuration of a reference signal and a synchronization signal associated with the cell ID). The RRC reconfiguration message is hereinafter referred to as an IAB node configuration message.

The IAB node configuration message may include configuration information of a default bearer (or a default link). The default bearer (or the default link) is, for example, a bearer (or a link) for performing relay of a System Information Block (SIB), relay of Msg3 from the UE, and the like.

The IAB node configuration message may include configuration information of the stack on the donor gNB 200-1 side, and optionally, configuration information of the stack on the IAB node 300-2 (or the UE 100) side. For the configuration information of the stack on the IAB node 300-2 (or the UE 100) side, a configuration group implicitly broadcast with the SIB of the donor gNB 200-1 may be reused, or the configuration information may be configured from an operator (OAM) (in advance).

The contents of the configuration in the IAB node configuration message may include, basically, all of the configurations included in the RRC reconfiguration message, and the following may be included: RLC configuration (operation modes such as Acknowledged Mode (AM)/Unacknowledged Mode (UM)/Transparent Mode (TM), a Logical Channel Prioritization (LCP) parameter, or the like), MAC configuration (Buffer Status Report (BSR)/Timing Advance Group (TAG)/Power Headroom (PHR) parameter, Discontinues Reception (DRX) configuration, or the like), and PHY configuration.

In the contents of the configuration in the IAB node configuration message, configuration of the adaptation layer (mapping (routing) configuration of a logical channel on a lower side or an upper side, priority configuration, or the like) may be included.

In addition, in the contents of the configuration in the IAB node configuration message, as necessary, a (virtual) IP address (specifically, an L3 address) of the IAB node 300-1 may be included. This is because, for example, the protocol stack of F1 is assumed to be SCTP over IP for establishing the F1 interface on the L2 link.

Note that the contents of the configuration of the IAB node configuration message are not limited to configuration information of an NR protocol, and may be configuration information of an LTE protocol (RLC, MAC, PHY).

In the present embodiment, before establishing backhaul link connection, the IAB node 300-1 may transmit, to the gNB 200-1, an indication indicating that the IAB node 300-1 has a function of the IAB node (specifically, a Layer 2 relay function) or that the IAB node 300-1 requests establishment of backhaul link connection. In this manner, the gNB 200-1 can appropriately start a procedure for establishing backhaul link connection. The indication is hereinafter referred to as an IAB indication. The IAB indication may include information indicating intention or capability as to whether a link protocol stack for the UE function in the IAB node 300-1 is prepared in LTE, is prepared in NR, or is prepared in both.

Note that the IAB node 300-1 may transmit the IAB indication after establishing the access link connection with the gNB 200-1, or may transmit the IAB indication during a procedure of establishing the access link connection with the gNB 200-1.

Conditions for enabling transmission of the IAB indication to the gNB may include a condition that the SIB including a donor function identifier indicating that the gNB has the donor function has been received from the gNB. In such a case, the IAB node 300-1 transmits the IAB indication to the gNB 200-1 only on the condition that the IAB node 300-1 has received the donor function identifier in the SIB from the gNB 200-1.

In the present embodiment, the gNB 200-1 may have the donor function of establishing the backhaul link connection with the IAB node 300-1. In this case, the gNB 200-1 receives the IAB indication from the IAB node 300-1, and then transmits the IAB node configuration message to the IAB node 300-1. In contrast, when the gNB 200-1 does not have the donor function, the gNB 200-1 may receive the IAB indication from the IAB node 300-1, and then transmit a handover request of requesting handover of the IAB node 300-1 to another gNB, instead of transmitting the IAB node configuration message to the IAB node 300-1. Here, it is preferable that the gNB 200-1 store information of another gNB having the donor function in advance. The gNB 200-1 may acquire the information of another gNB having the donor function from the IAB node 300-1. The IAB node 300-1 obtains the information from the 5GC 10 (core network), or checks the SIB (donor function identifier) of a neighbor cell. In this manner, the IAB node 300-1 acquires information of another gNB (neighbor cell) having the donor function, and reports the acquired information to the gNB 200-1. The gNB 200-1 transmits the handover request to another gNB having the donor function, based on the stored information or the information acquired from the IAB node 300-1. In this manner, after the IAB node 300-1 is handed over to another gNB, the IAB node 300-1 can establish backhaul link connection with such another gNB. Alternatively, when the gNB 200-1 does not have the donor function, the IAB node 300-1 may request the 5GC 10 to perform handover to a cell (gNB) having the donor function, and the 5GC 10 may perform processing related to handover.

In the present embodiment, the gNB 200-1 may transmit measurement configuration for configuring radio measurement to the IAB node 300-1 in response to reception of the IAB indication from the IAB node 300-1. The IAB node 300-1 receives the measurement configuration from the gNB 200-1, and then transmits a measurement report including results of the radio measurement to the gNB 200-1. The gNB 200-1 determines whether the gNB 200-1 is an appropriate donor gNB or another gNB is the appropriate donor gNB, based on the measurement report from the IAB node 300-1. For example, based on the measurement report, when measurement results for another gNB are more satisfactory than measurement results for the gNB 200-1, and a difference between these measurement reports is larger than a threshold, the gNB 200-1 determines that such another gNB is the appropriate donor gNB. Otherwise, the gNB 200-1 determines that the gNB 200-1 is the appropriate donor gNB.

Then, when the gNB 200-1 determines that the gNB 200-1 is the appropriate donor gNB 200-1, the gNB 200-1 transmits the IAB node configuration message to the IAB node 300-1. In contrast, when the gNB 200-1 determines that another gNB is the appropriate donor gNB, the gNB 200-1 transmits a handover request of requesting handover of the IAB node 300-1 to such another gNB, instead of transmitting the IAB node configuration message to the IAB node 300-1. In this manner, the IAB node 300-1 can be handed over to another gNB having a more satisfactory radio state, and the IAB node 300-1 can establish backhaul link connection with such another gNB.

In the present embodiment, after establishing the backhaul link connection, the gNB 200-1 may transmit context information related to the IAB node 300-1 to another gNB. The context information includes connection configuration of the AS layer on a radio side (contents of RRC reconfiguration), PDU session resource configuration on a network side (UE ID of an AMF or a Radio Access Network (RAN), a session ID, Quality of Service (QoS)/slice configuration, or the like), other related information (history information such as operation and communication of the IAB node, and/or preference information), and the like.

Specifically, even when the gNB 200-1 does not determine to hand over the IAB node 300-1 to another gNB, the gNB 200-1 transmits context information related to the IAB node 300-1 to such another gNB in advance. In this manner, when a radio state between the gNB 200-1 and the IAB node 300-1 deteriorates and the IAB node 300-1 thus reestablishes radio connection with another gNB, prompt reestablishment can be performed by using context information being shared in advance.

Here, it is preferable that the gNB 200-1 store a table in which the IAB node 300-1 and candidates of the donor gNBs of the IAB node 300-1 are associated with each other. The gNB 200-1 transmits the context information to another gNB being a candidate in the table. In this manner, the gNB 200-1 can share the context information with another appropriate gNB.

(1) Example of Normal Operation Sequence

Figure 6:
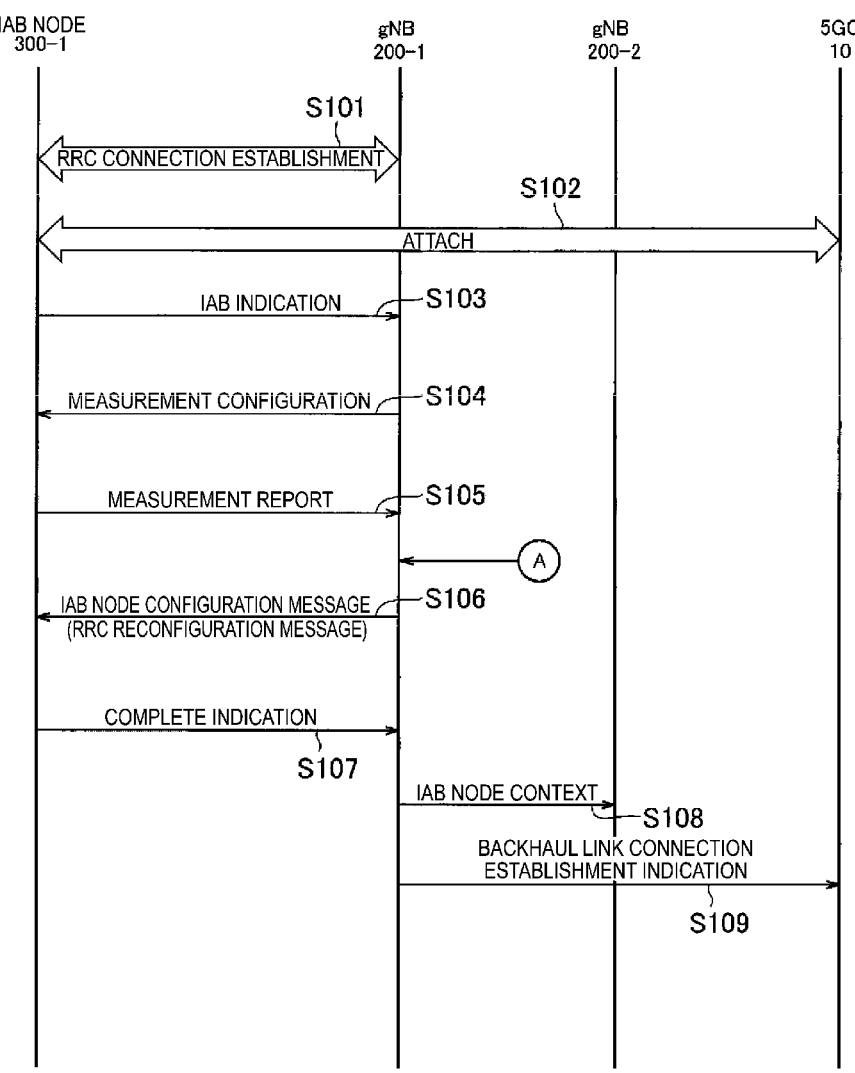
FIG. 6 is a diagram illustrating an example of a normal operation sequence according to a first embodiment.

FIG. 6 is a diagram illustrating an example of a normal operation sequence in the mobile communication system 1 according to the present embodiment.

As illustrated in FIG. 6, in Step S101, for example, the IAB node 300-1 performs a random access procedure for the gNB 200-1, and thereby establishes access link connection (RRC connection) with the gNB 200-1. The IAB node 300-1 may include the IAB indication in a message (for example, Msg3) to be transmitted to the gNB 200-1 during the random access procedure. In Step S101, the gNB 200-1 acquires context information related to the IAB node 300-1.

In Step S102, the IAB node 300-1 performs an attach procedure for the 5GC 10 (specifically, the AMF 11) via the gNB 200-1. Here, the IAB node 300-1 may transmit a report similar to the IAB indication (in other words, a report indicating intention to operate as the IAB node) to the AMF

11. In this manner, the IAB node 300-1 may obtain, from the AMF 11, routing information such as a candidate list of donor gNBs (cells) and presence or absence of a lower node, other management information, and the like. Alternatively, the AMF 11 may report, to each candidate of the donor gNB, indication that there has been attaching of the IAB node 300-1 and context information such as the routing information of the IAB node 300-1. Note that when the IAB node 300-1 has already attached, the attach processing in Step S102 can be omitted. Specifically, in Step S101, the IAB node 300-1 omits the attach processing when, for example, connection with the donor gNB needs to be reestablished due to occurrence of some error, such as in a case of RRC reestablishment.

In Step S103, the IAB node 300-1 transmits the IAB indication to the gNB 200-1. The IAB node 300-1 may transmit the IAB indication, with satisfaction of one or more of the following events being a trigger.

In a case of transmitting Msg5 (RRC Complete).

In a case where connection with the gNB is established (This may be Msg5 or later. For example, in a case where the first RRC reconfiguration is performed.)

In a case of obtaining IAB configuration information (see above) from the AMF (also including a case of already having the IAB configuration information).

In a case of simply having intention to operate as the IAB node (including receiving of an instruction of operating as the IAB node from the upper layer).

In a case of being requested to be the IAB node from the lower IAB node 300-2 or the UE 100-3 (in a case of receiving a signal indicating the request from the lower IAB node 300-2 or the UE 100-3).

In a case where the lower IAB node 300-2 or the UE 100-3 is already connected.

The IAB node 300-1 includes the IAB indication in an RRC message to be transmitted to the gNB 200-1, for example. The RRC message may be a "UE Capability Information" message indicating capability of the UE. Note that, when the IAB indication has been transmitted in Step S101, Step S103 can be omitted.

Alternatively, the IAB indication may be reported to the gNB 200-1 in the form of a modification of the PDU session resource from the AMF 11. Note that the AMF may be the AMF (dedicated) for IAB management.

In the present normal operation sequence, description is given on the assumption that the gNB 200-1 has donor capability. The gNB 200-1 determines that the gNB 200-1 needs to cause the IAB node 300-1 to establish backhaul link connection, based on the IAB indication.

In Step S104, the gNB 200-1 transmits measurement configuration for configuring radio measurement to the IAB node 300-1. The IAB node 300-1 performs radio measurement, based on the measurement configuration. For example, the IAB node 300-1 performs measurement of received power (received power of a cell specific reference signal) for a cell of the gNB 200-1 being the current serving cell and a cell of the gNB 200-2 being a neighbor cell.

In Step S105, the IAB node 300-1 transmits a measurement report including results of the radio measurement to the gNB 200-1. The gNB 200-1 determines whether the gNB 200-1 is an appropriate donor gNB or another gNB is the appropriate donor gNB, based on the measurement report. Here, description is given on the assumption that the gNB 200-1 determines that the gNB 200-1 is the appropriate donor gNB. Note that processing of Step S104 and Step S105 is not essential, and may be omitted.

In Step S106, the gNB 200-1 transmits an IAB node configuration message (RRC reconfiguration message) to the IAB node 300-1. The IAB node configuration message may include a handover instruction that specifies the cell of the gNB 200-1 (specifically, the current serving cell of the IAB node 300-1) as a handover destination. The IAB node 300-1 performs processing of establishing the backhaul link connection with the gNB 200-1, based on the IAB node configuration message. The establishment processing includes processing of generating a protocol stack for a backhaul link (adaptation/RLC/MAC/PHY entity) and performing parameter configuration, based on the configuration information in the IAB node configuration message. The establishment processing may include processing of preparing a protocol stack on the UE side (for an access link) and starting transmission of a synchronization signal and a cell specific reference signal (or, processing of preparing for the starting).

In Step S107, the IAB node 300-1 transmits, to the gNB 200-1, a complete indication message indicating that the IAB node configuration including establishment of the backhaul link connection has completed. In or after Step S107, the IAB node 300-1 operates as the IAB node for the gNB 200-1, instead of operating as the UE.

In Step S108, the gNB 200-1 transfers the context information acquired in Step S101 to the gNB 200-2 over the Xn interface. The gNB 200-1 stores a table in which the IAB node 300-1 and candidates of the donor gNBs of the IAB node 300-1 are associated with each other, and determines a context transfer destination by referring to the table. With the gNB 200-1 transferring the context to another gNB in advance as described above, when the radio connection state with the gNB connecting to the IAB node 300-1 deteriorates, reconnection with such another gNB can be established immediately. FIG. 7 is a diagram illustrating an example of a table for determining the context transfer destination. The table is, for example, configured for each gNB by the operator in advance. As illustrated in FIG. 7, in the table, each IAB node is associated with candidates of the donor gNBs. Specifically, each identifier related to the IAB node is associated with identifiers of the candidates of the donor gNBs. For example, the gNBs that are geographically close to the IAB node are configured as the candidates of the donor gNBs of the IAB node. Note that the table of FIG. 7 illustrates an example of association with the gNBs, but association with cell IDs may be used. The cell ID may be a physical layer cell ID, or may be a global cell ID. Note that the gNB 200-1 may determine that the gNB 200-1 that is geographically close to the IAB node 300-1 is the donor candidate, based on the measurement report received from the IAB node 300-1. The gNB 200-1 may create a table in which the IAB node 300-1 and the candidates of the donor gNBs of the IAB node 300-1 are associated with each other or may update an existing table, based on the determined donor candidates.

In Step S109, the gNB 200-1 transmits a report indicating that the backhaul link connection with the IAB node 300-1 has established to the 5GC 10. Alternatively, the gNB 200-1 may transmit an establishment request of a PDU session for the IAB node to the 5GC 10. Note that, as described above, the establishment request of the PDU session may be transmitted from the AMF 11 to the gNB 200-1 prior to Step S109 or in Step S109.

(2) Example of Exceptional Operation Sequence

Figure 8:
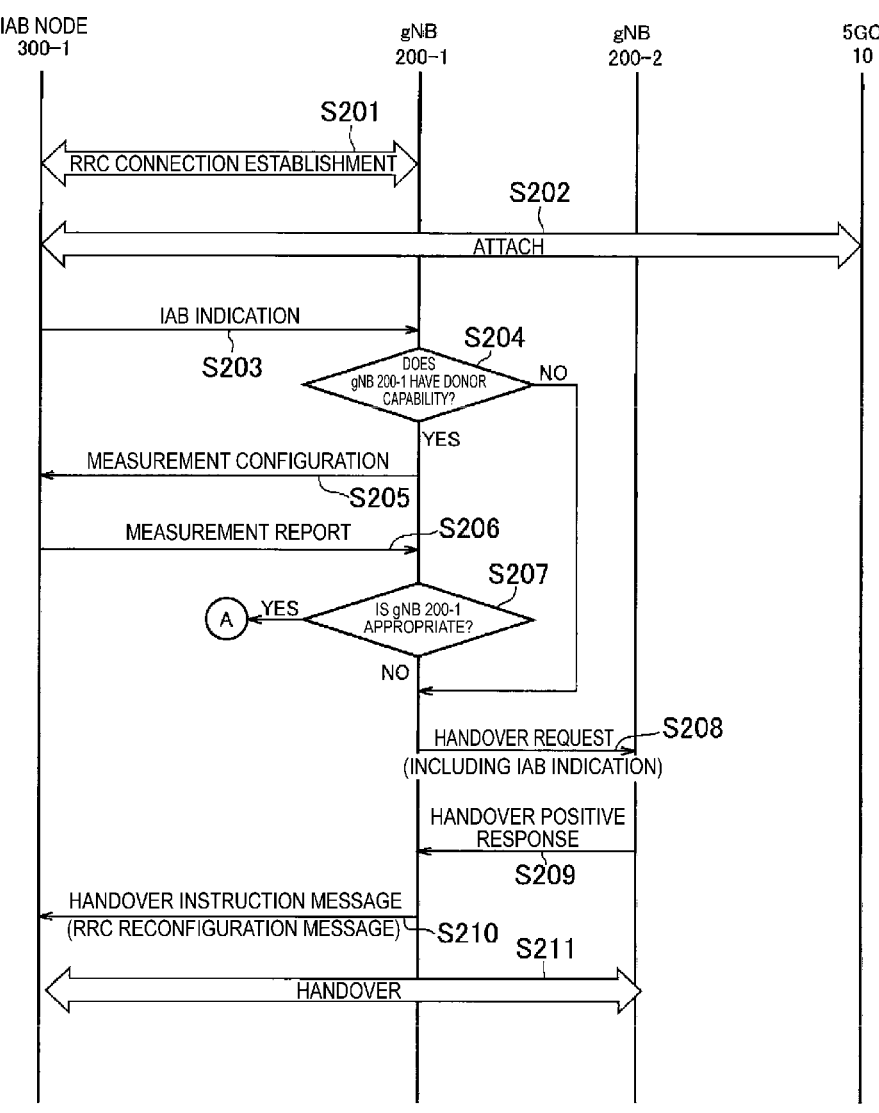
FIG. 8 is a diagram illustrating an example of an exceptional operation sequence according to the first embodiment.

FIG. 8 is a diagram illustrating an example of an exceptional operation sequence in the mobile communication system 1 according to the present embodiment. In the exceptional operation sequence, the gNB 200-1 hands over the IAB node 300-1 to the gNB 200-2.

As illustrated in FIG. 8, in Step S201, the IAB node 300-1 performs the random access procedure for the gNB 200-1, for example, and thereby establishes access link connection (RRC connection) with the gNB 200-1. The IAB node 300-1 may include the IAB indication in a message (for example, Msg3) to be transmitted to the gNB 200-1 during the random access procedure. In Step S201, the gNB 200-1 acquires context information related to the IAB node 300-1.

In Step S202, the IAB node 300-1 performs the attach procedure for the 5GC 10 (specifically, the AMF 11) via the gNB 200-1.

In Step S203, the IAB node 300-1 transmits the IAB indication to the gNB 200-1. The IAB node 300-1 includes the IAB indication in the RRC message to be transmitted to the gNB 200-1, for example. The RRC message may be a "UE Capability Information" message indicating capability of the UE. Note that, when the IAB indication has been transmitted in Step S201, Step S203 can be omitted.

In Step S204, the gNB 200-1 determines whether or not the gNB 200-1 has donor capability. When the gNB 200-1 does not have the donor capability (Step S204: NO), the gNB 200-1 causes the processing to proceed to Step S208.

When the gNB 200-1 has the donor capability (Step S204: YES), the gNB 200-1 transmits the measurement configuration for configuring radio measurement to the IAB node 300-1 in Step S205. The IAB node 300-1 performs radio measurement, based on the measurement configuration. For example, the IAB node 300-1 performs measurement of received power (received power of a cell specific reference signal) for a cell of the gNB 200-1 being the current serving cell and a cell of the gNB 200-2 being a neighbor cell.

In Step S206, the IAB node 300-1 transmits a measurement report including results of the radio measurement to the gNB 200-1.

In Step S207, the gNB 200-1 determines whether the gNB 200-1 is an appropriate donor gNB or another gNB is the appropriate donor gNB, based on the measurement report. When the gNB 200-1 determines that the gNB 200-1 is the appropriate donor gNB (Step S207: YES), the gNB 200-1 causes the processing to proceed to Step S106 of the normal operation sequence (see FIG. 6) described above.

In contrast, when the gNB 200-1 determines that another gNB is the appropriate donor gNB (Step S207: NO), the gNB 200-1 causes the processing to proceed to Step S208.

In Step S208, the gNB 200-1 transfers a handover request message including the IAB indication received from the IAB node 300-1 to the gNB 200-2 over the Xn interface. The gNB 200-1 may include the context information acquired in Step S201 in the handover request message. Alternatively, the gNB 200-1 may include information indicating that the IAB node 300-1 requests the gNB to function as the donor gNB in the handover request message, instead of including the IAB indication, and transmit the handover request message. Note that, in Step S208, the gNB 200-1 may transfer the handover request message to the gNB 200-2 over the Xn interface, after determining that the gNB 200-2 has the donor capability. Specifically, for example, when the gNB 200-1 determines that the gNB 200-2 is associated with the IAB node 300-1 as the donor candidate based on the table illustrated in FIG. 7, the gNB 200-1 may transfer the handover request message to the gNB 200-2. In this case, the probability that the gNB 200-2 rejects the handover request is reduced, and the handover of the IAB node 300-1 can be executed sooner. Alternatively, via the Xn interface, a plurality of gNBs 200 that neighbor each other may share information related to their donor capabilities with each other in advance. In this manner, the gNB 200-1 can identify the neighboring gNB 200 having the donor capability, and can transfer the handover request message to the identified neighboring gNB 200.

The gNB 200-2 determines whether or not to accept handover of the IAB node 300-1, also in consideration of the IAB indication included in the handover request message. When the gNB 200-2 does not have the donor capability, the gNB 200-2 may reject the handover request. Here, description is given on the assumption that the gNB 200-2 determines to accept handover of the IAB node 300-1.

In Step S209, the gNB 200-2 transmits a handover positive response message to the gNB 200-1 over the Xn interface.

In Step S210, the gNB 200-1 transmits a handover instruction message (RRC reconfiguration message) to the IAB node 300-1, based on the handover positive response message from the gNB 200-2. The handover instruction message includes information for specifying (a cell of) the gNB 200-2 that is the handover destination.

In Step S211, the IAB node 300-1 performs handover to the gNB 200-2, based on the handover instruction message from the gNB 200.

(3) Example of Multi-Hop Connection Sequence

Figure 9:
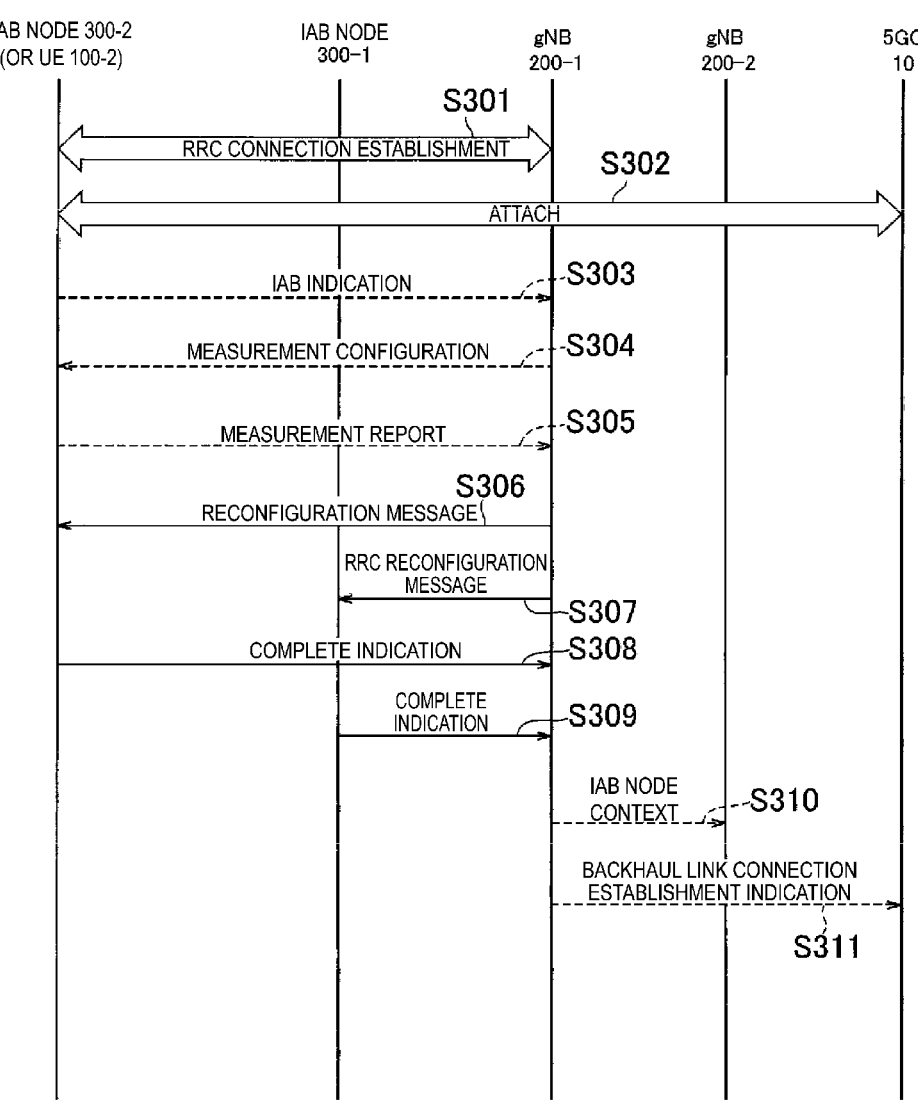
FIG. 9 is a diagram illustrating an example of a multi-hop connection sequence according to the first embodiment.

FIG. 9 is a diagram illustrating an example of a multi-hop connection sequence in the mobile communication system 1 according to the present embodiment. The multi-hop connection sequence is a sequence of a case in which the IAB node 300-2 or the UE 100-2 is connected to the IAB node 300-1 after the backhaul link connection is established between the IAB node 300-1 and the gNB 200-1. Here, a case in which the IAB node 300-2 is connected to the IAB node 300-1 will be mainly described, but the IAB node 300-2 may be read as the UE 100-2 as appropriate. Description overlapping with that of "(1) Normal Operation Sequence" described above will be omitted.

As illustrated in FIG. 9, in Step S301, the IAB node 300-2 performs the random access procedure for the gNB 200-1 via the IAB node 300-1, and thereby establishes access link connection (RRC connection) with the gNB 200-1. The IAB node 300-2 may include the IAB indication in a message (for example, Msg3) to be transmitted to the gNB 200-1 during the random access procedure. In Step S301, the gNB 200-1 acquires context information related to the IAB node 300-2.

In Step S302, the IAB node 300-2 performs the attach procedure for the 5GC 10 (specifically, the AMF 11) via the IAB node 300-2 and the gNB 200-1. Here, the IAB node 300-2 may transmit a report similar to the IAB indication (in other words, a report indicating intention to operate as the IAB node) to the AMF 11. In this manner, the IAB node 300-2 may obtain, from the AMF 11, routing information such as a candidate list of donor gNBs (cells) and presence or absence of a lower node, other management information, and the like. Alternatively, the AMF 11 may report indication that there has been attaching of the IAB node 300-2 and context information such as the routing information of the IAB node 300-2 to each candidate of the donor gNB. Note that when the IAB node 300-2 has already attached, the attach processing in Step S302 can be omitted. Specifically, the IAB node 300-2 omits the attach processing when, for example, connection with the donor gNB needs to be reestablished due to occurrence of some error, such as in a case of RRC reestablishment.

In Step S303, the IAB node 300-2 transmits the IAB indication to the gNB 200-1 via the IAB node 300-1. The IAB node 300-2 may transmit the IAB indication in response to a trigger similar to the trigger described in Step S103 of "(1) Normal Operation Sequence" described above.

The IAB node 300-2 includes the IAB indication in an RRC message to be transmitted to the gNB 200-1, for example. The RRC message may be a "UE Capability Information" message indicating capability of the UE. Note that, when the IAB indication has been transmitted in Step S301, Step S303 can be omitted.

Alternatively, the IAB indication may be reported to the gNB 200-1 in the form of a modification of the PDU session resource from the AMF 11. Note that the AMF may be the AMF (dedicated) for IAB management.

In the present operation sequence, it is assumed that the gNB 200-1 has the donor capability. Thus, the gNB 200-1 determines that the backhaul link connection needs to be established between the IAB node 300-1 and the IAB node 300-2, based on the IAB indication.

In Step S304, the gNB 200-1 transmits measurement configuration for configuring radio measurement to the IAB node 300-2. The IAB node 300-2 performs radio measurement, based on the measurement configuration.

In Step S305, the IAB node 300-2 transmits a measurement report including results of the radio measurement to the gNB 200-1 via the IAB node 300-1. The gNB 200-1 determines whether the gNB 200-1 is an appropriate donor gNB or another gNB is the appropriate donor gNB, based on the measurement report. Here, description is given on the assumption that the gNB 200-1 determines that the gNB 200-1 is the appropriate donor gNB. Note that processing of Step S304 and Step S305 is not essential, and may be omitted.

In Step S306, the gNB 200-1 transmits the IAB node configuration message (RRC reconfiguration message) to the IAB node 300-2. The IAB node 300-2 performs processing of establishing the backhaul link connection with the IAB node 300-1, based on the IAB node configuration message. The establishment processing includes processing of generating a protocol stack for a backhaul link (adaptation/RLC/MAC/PHY entity) and performing parameter configuration, based on the configuration information in the IAB node configuration message. The establishment processing may include processing of preparing a protocol stack on the UE side (for an access link) and starting transmission of a synchronization signal and a cell specific reference signal (or, processing of preparing for the starting).

In Step S307, the gNB 200-1 transmits the RRC reconfiguration message to the IAB node 300-1. The RRC reconfiguration message is a message for changing the configuration in the IAB node 300-1 due to addition of the IAB node 300-2. The RRC reconfiguration message includes, for example, mapping information indicating association between the logical channel of the IAB node 300-2 and the logical channel of the backhaul link of the IAB node 300-1. Note that Step S307 may be prior to Step S306, or may be simultaneous with Step S306.

In Step S308, the IAB node 300-2 transmits, to the gNB 200-1, a complete indication message indicating that the IAB node configuration including establishment of the backhaul link connection with the IAB node 300-1 has completed. In or after Step S308, the IAB node 300-2 operates as the IAB node for the gNB 200-1, instead of operating as the UE.

In Step S309, the IAB node 300-1 transmits, to the gNB 200-1, a complete indication message indicating that configuration change due to the establishment of the backhaul link connection with the IAB node 300-2 has completed. Note that Step S309 may be prior to Step S308, or may be simultaneous with Step S308.

In Step S310, the gNB 200-1 transfers the context information of the IAB node 300-2 acquired in Step S301 to the gNB 200-2 over the Xn interface.

In Step S311, the gNB 200-1 transmits a report indicating that the backhaul link connection of the IAB node 300-2 has established to the 5GC 10. Alternatively, the gNB 200-1 may transmit an establishment request of a PDU session for the IAB node 300-2 to the 5GC 10. Note that, as described above, the establishment request of the PDU session may be transmitted from the AMF 11 to the gNB 200-1 prior to Step S311 or in Step S311.

Modification Examples of First Embodiment

In the first embodiment described above, an example has been described, in which the IAB node 300-1 is handed over in a case where the IAB node 300-1 is connected to the gNB 200-1 by radio, but then the gNB 200-1 does not have the donor capability. However, each gNB 200 may provide the IAB node 300-1 with information related to whether or not the gNB 200 has the donor capability. In this manner, the IAB node 300-1 can select the gNB 200 having the donor capability and then connect to the gNB 200. For example, the gNB 200 having the donor capability includes information indicating that the gNB 200 has the donor capability in the system information block (SIB) and broadcasts the SIB. The IAB node 300-1 selects the gNB 200 to be a connection destination, based on the SIB. When the gNB 200 has the donor capability and received power from the gNB 200 is a threshold or higher, the IAB node 300-1 may select this gNB 200 as the connection destination. Alternatively, when the gNB 200 does not have the donor capability, the IAB node 300-1 may reselect another gNB 200 in response to reception of the SIB transmitted from the gNB 200. Subsequently, when it is indicated based on the SIB transmitted from another gNB 200 that such another gNB 200 has the donor capability, the IAB node 300-1 may perform the random access procedure and transmit the IAB indication, with such another gNB 200 as the connection destination.

Alternatively, each gNB 200 may report that the gNB 200 has capability of handling the IAB node 300 by using the SIB, in addition to or instead of reporting that the gNB 200 has the donor capability by using the SIB. For example, each gNB 200 may report that the gNB 200 has a function of handing over the IAB node 300 to another gNB (donor gNB) by using the SIB.

In the first embodiment described above, an example has been described, in which the IAB node 300 includes the IAB indication in a message (for example, Msg3) to be transmitted to the gNB 200 during the random access procedure. Here, the Msg3 is, for example, an RRC Setup Request message. The IAB node 300 may include the IAB indication in an Establishment Cause being a field (information element) in the Msg3.

Alternatively, the IAB node 300 may report the IAB indication by using a random access preamble (Msg1) transmitted to the gNB 200 during the random access procedure. For example, when Physical Random Access Channel (PRACH) resources for the IAB indication are reported using the SIB, the IAB node 300 transmits the random access preamble using the PRACH resource selected out of the reported PRACH resources for the IAB indication. In this manner, the IAB node 300 may report the IAB indication. Here, the PRACH resource may be a time and frequency resource, or may be a signal sequence (preamble sequence).

Alternatively, the IAB node 300 may report the IAB indication at timing other than the random access procedure. For example, the IAB node 300 may include the IAB indication in an RRC message such as a UE Assistance Information message.

In the first embodiment described above, an example has been described, in which the gNB 200 transmits the measurement configuration for configuring the radio measurement to the IAB node 300 or the UE 100, and receives the measurement report including results of the radio measurement, and the gNB 200 thereby determines whether the gNB 200 is the appropriate donor gNB or another gNB is the appropriate donor gNB, based on the measurement report. However, the gNB 200 may use the measurement report for change of a network topology and a change of a data transfer path, not only in the case of using measurement results at the time of such initial connection.

Second Embodiment

Regarding a second embodiment, the difference from the first embodiment described above will mainly be described. The present embodiment may be carried out together with the first embodiment described above, or may be carried out separately from the first embodiment described above.

When a lower apparatus immediately under the IAB node 300 detects a radio link failure (RLF) with the IAB node 300, the lower apparatus reselects another cell, and attempts reestablishment of connection with the reselected cell. However, because the RLF is basically detected based on a downlink reception state, the IAB node 300 may not be able to know that the lower apparatus has detected the RLF.

Figure 10:
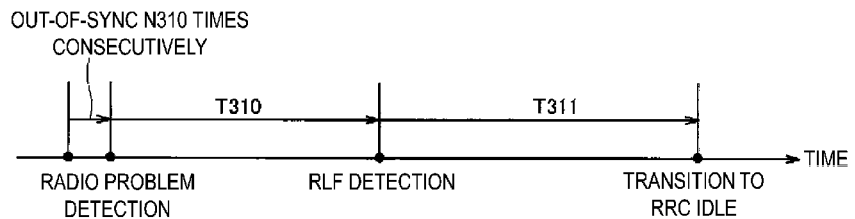
FIG. 10 is a diagram illustrating operation related to an RLF.

Here, typical operation of the lower apparatus related to the RLF will be described. As illustrated in FIG. 10, when the lower apparatus consecutively detects an out-of-sync state N310 times, the lower apparatus detects a radio problem. When the lower apparatus detects the radio problem, the lower apparatus starts a predetermined timer T310. When the lower apparatus consecutively detects an in-sync state N311 times after starting the timer T310, the lower apparatus stops the timer T310. When the timer T310 expires, the lower apparatus detects the RLF and also starts a timer T311, and starts cell reselection operation (connection reestablishment processing). Then, when the timer T311 expires without success in the connection reestablishment, the lower apparatus transitions to an RRC idle mode.

Figure 11:
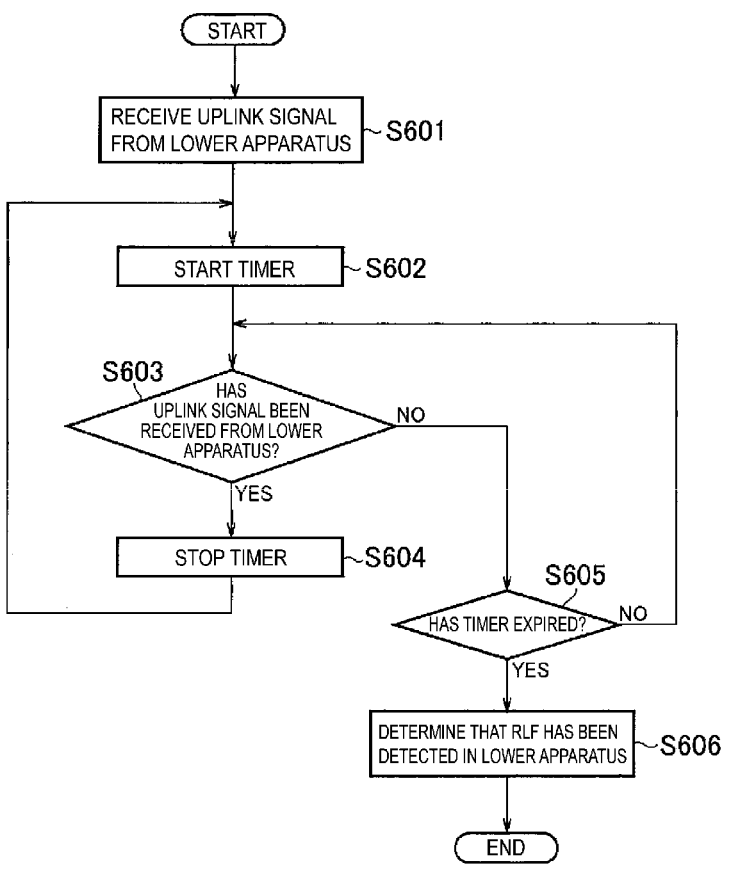
FIG. 11 is a diagram illustrating operation of an IAB node according to a second embodiment.

FIG. 11 is a diagram illustrating operation of the IAB node 300 according to the second embodiment.

As illustrated in FIG. 11, in Step S601, the IAB node 300 receives an uplink signal periodically transmitted from the lower apparatus immediately under the IAB node 300. The lower apparatus refers to the UE 100, or another IAB node being interposed between the UE 100 and the IAB node 300. The uplink signal may be a signal that can be transmitted periodically. For example, as the uplink signal, a MAC CE (for example, a buffer status report), an RRC message (for example, a measurement report message), and/or an uplink reference signal can be used.

In Step S602, the IAB node 300 starts a timer in response of reception of the uplink signal from the lower apparatus. A timer value configured in the timer may be a value configured from the donor gNB 200-1. The timer value may be time longer than an interval at which the lower apparatus transmits the uplink signal.

After starting the timer, when the IAB node 300 receives the uplink signal from the lower apparatus (Step S603: YES), in Step S604, the IAB node 300 stops the timer. In this case, the processing returns to Step S602, and the timer is restarted.

In contrast, when the IAB node 300 does not receive the uplink signal from the lower apparatus (Step S603: NO), and the timer expires (Step S605: YES), the IAB node 300 determines that the lower apparatus has detected the RLF in Step S606. When the IAB node 300 determines that the lower apparatus of the IAB node 300 has detected the RLF, the IAB node 300 may request an upper apparatus of the IAB node 300 to release a radio bearer (backhaul link) corresponding to the lower apparatus.

According to the second embodiment, the IAB node 300 can know that the RLF is detected in the lower apparatus.

Figure 12:
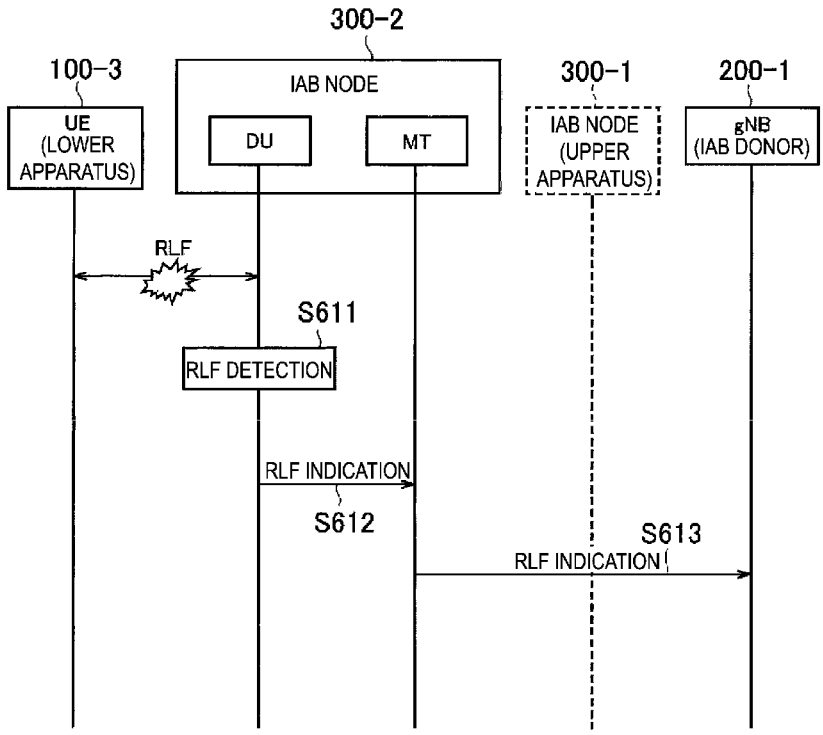
FIG. 12 is a diagram illustrating an example of an operation sequence according to the second embodiment.

FIG. 12 is a diagram illustrating an example of an operation sequence according to the second embodiment. In the example illustrated in FIG. 12, the IAB node 300-2 connects to the UE 100-3 as the lower apparatus and the IAB node 300-1 as the upper apparatus by radio, and relays communication between the UE 100-3 and the IAB node 300-1 by radio. In the IAB node 300-2, a base station function unit (DU) connects to the UE 100-3 by radio, and a user equipment function unit (MT) connects to the IAB node 300-1 by radio.

Note that the lower apparatus may be an IAB node. The IAB node 300-2 may be connected to the donor apparatus (gNB 200-1) by radio without the IAB node 300-1 being interposed therebetween. In this case, the upper apparatus and the donor apparatus are the same apparatus.

As illustrated in FIG. 12, in Step S611, the base station function unit (DU) of the IAB node 300-2 detects a radio link failure (RLF) with the UE 100-3. Such an RLF may be referred to as a fronthaul RLF from the viewpoint of the IAB node 300-2.

As a method of detecting the RLF other than the method described above, a method based on an ACK/NACK from the UE 100-3 can be used. Specifically, when the base station function unit (DU) of the IAB node 300-2 does not receive a response of an ACK or a NACK from the UE 100-3 even after performing downlink HARQ retransmission, for example, the base station function unit (DU) detects an RLF with the UE 100-3.

In Step S612, the base station function unit (DU) of the IAB node 300-2 reports state information (RLF indication) indicating that the base station function unit (DU) has detected the RLF with the UE 100-3 to the user equipment function unit (MT) of the IAB node 300-2. The state information (RLF indication) may include an identifier related to the UE 100-3, for example, a UE identifier and/or a bearer identifier.

In Step S613, the user equipment function unit (MT) of the IAB node 300-2 transmits an RRC message including the state information (RLF indication) to the donor gNB 200-1 via the IAB node 300-1. The donor gNB 200-1 may release the bearer corresponding to the UE 100-3, based on the state information (RLF indication) included in the RRC message.

The sequence illustrated in FIG. 12 may be changed as follows.

Specifically, in Step S612, the base station function unit (DU) of the IAB node 300-2 reports state information (RLF indication) indicating detection of the RLF with the UE 100-3 to an F1-AP entity of the IAB node 300-2. The state information (RLF indication) may include an identifier related to the UE 100-3, for example, a UE identifier and/or a bearer identifier. The F1-AP entity refers to a communication function unit that performs communication with the donor gNB 200-1 over the F1 interface being an interface of the fronthaul.

In Step S613, the user equipment function unit (MT) of the IAB node 300-2 transmits an F1-AP message including the state information (RLF indication) to the donor gNB 200-1 via the IAB node 300-1. The donor gNB 200-1 may release the bearer corresponding to the UE 100-3, based on the state information (RLF indication) included in the F1-AP message.

The sequence illustrated in FIG. 12 may be changed as follows.

Specifically, in Step S611, the base station function unit (DU) of the IAB node 300-2 detects that all of the lower apparatuses under control of the base station function unit (DU) have transitioned to an RRC idle state or an RRC inactive state.

In Step S612, the base station function unit (DU) of the IAB node 300-2 reports, to the user equipment function unit (MT) or the F1-AP entity of the IAB node 300-2, state information indicating that all of the lower apparatuses under control of the base station function unit (DU) have transitioned to the RRC idle state or the RRC inactive state.

In Step S613, the user equipment function unit (MT) or the F1-AP entity of the IAB node 300-2 transmits, to the donor gNB 200-1 via the IAB node 300-1, a Release Assistance Indication (RAI) indicating that RRC connection of the user equipment function unit (MT) or the F1-AP entity can be released, based on the state information from the base station function unit (DU). The donor gNB 200-1 may release the RRC connection of the UE 100-3, based on the RAI.

Modification Example of Second Embodiment

In the second embodiment, the IAB node 300-2 reports the RLF between the IAB node 300-2 and the lower apparatus to the donor gNB 200-1. However, the lower apparatus may report the RLF detected with another IAB node to the donor gNB 200-1.

Figure 13:
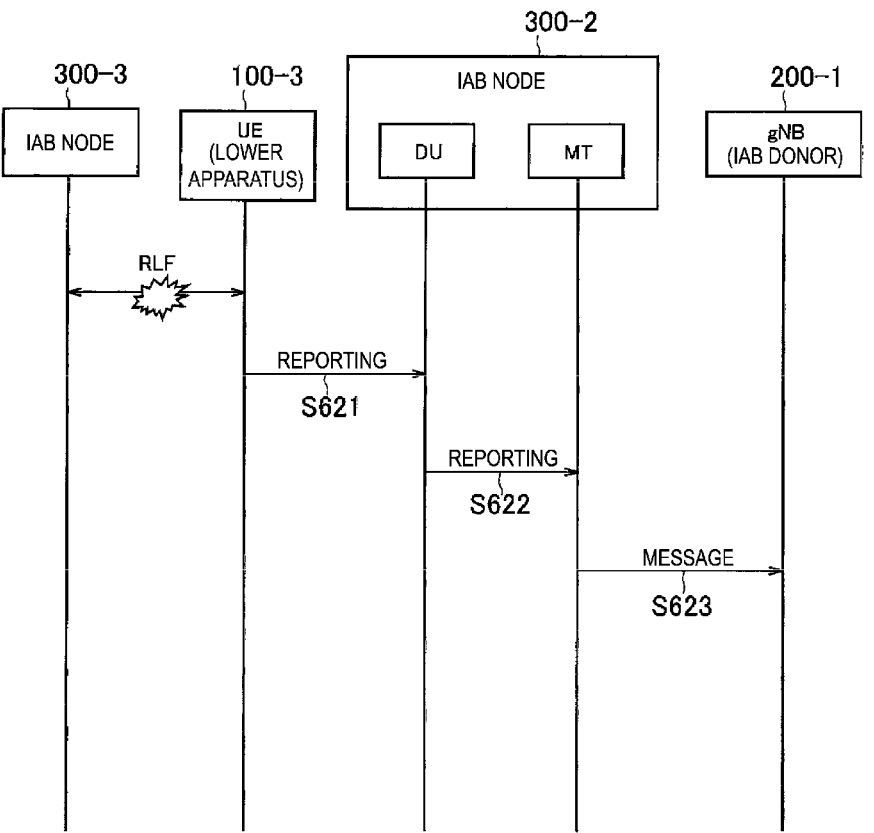
FIG. 13 is a diagram illustrating an operation sequence according to a modification example of the second embodiment.

FIG. 13 is a diagram illustrating an operation sequence according to a modification example of the second embodiment. In FIG. 13, another IAB node may be interposed between the IAB node 300-2 and the donor gNB 200-1.

As illustrated in FIG. 13, in Step S621, the base station function unit (DU) of the IAB node 300-2 receives an indication indicating occurrence of the RLF with the IAB node 300-3 from the lower apparatus (UE 100-3) connected to the IAB node 300-2. The indication may be an RRC Reestablishment message or an RLF Indication.

For example, the UE 100-3 detects the RLF with the IAB node 300-3, and performs connection reestablishment with the IAB node 300-2. Here, the UE 100-3 transmits an RRC Reestablishment message to the IAB node 300-2. The RRC Reestablishment message may include information indicating that the UE 100-3 has connected to the IAB node 300-3 (which may be an identifier of the IAB node 300-3), an identifier of the donor apparatus to which the UE 100-3 has connected via the IAB node 300-3, and/or the like, as well as the identifier of the UE 100-3.

Alternatively, the UE 100-3 detects the RLF with the IAB node 300-3 during dual connectivity (DC) communication of simultaneously connecting to the IAB nodes 300-3 and 300-2, and transmits the RLF Indication related to the RLF to the IAB node 300-2. When the IAB node 300-3 is configured as a master node (MN), the RLF Indication may be referred to as a Master Cell Group (MCG) RLF Indica-
tion. The RLF Indication may include an identifier of the UE
100-3, an identifier of the IAB node 300-3, an identifier of
the donor apparatus to which the UE 100-3 has connected
via the IAB node 300-3, and the like.

In Step S622, the base station function unit (DU) of the
IAB node 300-2 reports information included in the indica-
tion received from the UE 100-3 in Step S621 to a terminal
function unit (MT) or the F1-AP entity of the IAB node
300-2.

In Step S623, the terminal function unit (MT) or the
F1-AP entity of the IAB node 300-2 transmits a message
including the information reported from the base station
function unit (DU) to the donor gNB 200-1. The message is
an RRC message or an F1-AP message.

When the donor gNB 200-1 determines, based on the
information included in the received message, that the UE
100-3 has been under control of another donor apparatus, in
other words, that the UE 100-3 has belonged to a topology
of another donor apparatus, the donor gNB 200-1 may
perform reporting to such another donor apparatus. The
indication may include at least one of the identifier of the UE
100-3 or the identifier of the IAB node 300-3.

Third Embodiment

Regarding a third embodiment, the difference from the
first embodiment and the second embodiment described
above will mainly be described. The present embodiment
may be carried out together with the first embodiment and
the second embodiment described above, or may be carried
out separately from the first embodiment and the second
embodiment described above.

Figure 14:
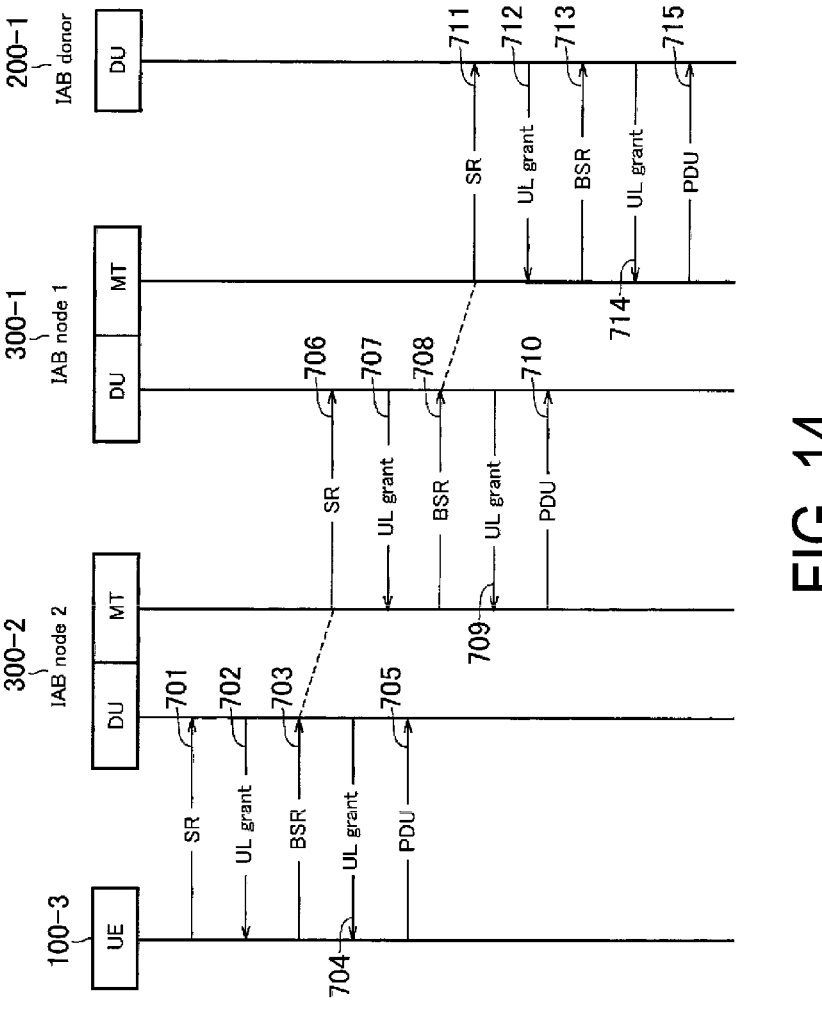
FIG. 14 is a diagram illustrating operation according to a third embodiment.

FIG. 14 is a diagram illustrating operation according to
the third embodiment. In FIG. 14, "DU" corresponds to the
base station function, and "MT" corresponds to the user
equipment function.

As illustrated in FIG. 14, the UE 100-3 transmits uplink
data (PDU) to the IAB node 300-2 through the procedure of
Steps S701 to S705. Specifically, the UE 100-3 transmits a
scheduling request (SR) to the IAB node 300-2 (Step S701),
receives allocation of uplink radio resources for BSR trans-
mission (Step S702), transmits a BSR (Step S703), receives
allocation of uplink radio resources for uplink data trans-
mission (Step S704), and transmits uplink data to the IAB
node 300-2 (Step S705).

Similarly, the IAB node 300-2 transmits uplink data
(PDU) to the IAB node 300-1 through the procedure of Steps
S706 to S710.

The IAB node 300-1 transmits uplink data (PDU) to the
donor gNB 200-1 through the procedure of Steps S711 to
S715.

In the present sequence, each IAB node 300 receives the
first scheduling request of requesting allocation of uplink
radio resources from the lower apparatus. Then, each IAB
node 300 transmits the second scheduling request to the
upper apparatus before receiving the uplink data (PDU)
from the lower apparatus.

Generally, the scheduling request is triggered when there
is uplink data that ought to be transmitted; however, in the
present embodiment, the scheduling request is triggered at a
phase where there is not the uplink data that ought to be
transmitted yet. In this manner, smooth allocation of uplink
radio resources can be implemented.

For example, when the IAB node 300-2 receives the BSR
from the UE 100-3 (Step S703), the IAB node 300-2
transmits the scheduling request to the IAB node 300-1 in
Step S706.

After the IAB node 300-2 receives the scheduling request
from the UE 100-3 (Step S701), the IAB node 300-2 may
transmit the scheduling request to the IAB node 300-1
before receiving the BSR from the UE 100-3 (Step S703).

After the IAB node 300-2 receives the scheduling request
from the UE 100-3 (Step S701), when the IAB node 300-2
allocates the uplink radio resources to the UE 100-3 (Step
S702), the IAB node 300-2 may transmit (trigger) the
scheduling request to the IAB node 300-1.

When the IAB node 300-2 receives the scheduling request
from the UE 100-3 (Step S701), the IAB node 300-2 may
transmit (trigger) the scheduling request to the IAB node
300-1.

In the present embodiment, each IAB node 300 transmits,
to the upper apparatus, the first buffer status report at least
indicating the amount of data that the IAB node 300 can use
for uplink transmission. Here, the upper apparatus refers to
another IAB node (upper IAB node) under control of the
donor gNB 200, or the donor gNB 200. The upper apparatus
allocates radio resources for uplink transmission to the IAB
node 300, based on the first buffer status report.

The IAB node 300 includes an uplink buffer that tempo-
rarily stores pending data to be transmitted in the uplink. For
example, the MAC layer of the IAB node 300 reports the
first buffer status including information indicating the data
amount in the uplink buffer to the MAC layer of the upper
apparatus. The MAC layer of the upper apparatus includes
a scheduler, and allocates uplink radio resources to the IAB
node 300, based on the first buffer status, and reports the
allocation resources to the IAB node 300 via a control
channel.

Here, it is conceivable that, because the IAB node 300
buffers uplink data for a plurality of pieces of UE, the IAB
node 300 has an uplink buffer having capacity larger than the
UE 100. Thus, the buffer status report for the IAB node may
have a format different from the buffer status report for the
UE. The data amount (maximum data amount) with which
the buffer status report for the IAB node can be expressed
may be larger than the data amount (maximum data amount)
with which the buffer status report for the UE can be
expressed.

The buffer status report for the IAB node may include
information related to the number of pieces of UE 100 under
control of the IAB node 300. The IAB node 300 may
determine the number of pieces of UEs 100 under control of
the IAB node 300, based on a UE context, a Cell-Radio
Network Temporary Identifier (C-RNTI), and the like, or the
number of pieces of UEs 100 under control of the IAB node
300 may be reported from the donor gNB 200. The IAB
node 300 may include, in the buffer status report, the number
of pieces of UE 100 that have data in their uplink buffers out
of the pieces of UE 100 under control of the IAB node 300.
In other words, the IAB node 300 may report, to the upper
apparatus, information as to the uplink data of how many
pieces of UE the IAB node 300 has, by using the buffer
status report. Alternatively, the IAB node 300 may include,
in the buffer status report, the number of pieces of UE 100
in an RRC connected state out of the pieces of UE 100 under
control of the IAB node 300.

Regarding the buffer status report for the IAB node, not
only the amount of data that is actually present in the uplink
buffer of the IAB node 300 but also the buffer status report
from the lower apparatus (specifically, a potential uplink data amount) may be taken into consideration. In this manner, the upper apparatus can allocate uplink radio resources to the IAB node 300 in advance taking the potential uplink data amount into consideration, and can thus reduce uplink transmission delay caused due to multi-hop.

The IAB node 300 receives, from the lower apparatus, the second buffer status report indicating the amount of data that the lower apparatus can use for uplink transmission. Based on the second buffer status report, the IAB node 300 transmits, to the upper apparatus, the first buffer status report that is based on the amount of data that the IAB node 300 can use for uplink transmission and the amount of data that the lower apparatus can use for uplink transmission. For example, the IAB node 300 may include, in the first buffer status report, a total value of the amount of data that the IAB node 300 can use for uplink transmission and the amount of data that the lower apparatus can use for uplink transmission. Alternatively, the IAB node 300 may separately include, in the first buffer status report, the first BSR value indicating the amount of data that the IAB node 300 can use for uplink transmission and the second BSR value indicating the amount of data that the lower apparatus can use for uplink transmission.

Note that the data amount that the IAB node 300 can use for uplink transmission may include the data amount of a transmission buffer (buffer of MT) of the IAB node 300, the data amount of a reception buffer (DU) of the IAB node 300, and/or the buffer amount of the adaptation entity.

Fourth Embodiment

Regarding a fourth embodiment, the difference from the first embodiment to the third embodiment described above will mainly be described. The present embodiment may be carried out together with the first embodiment to the third embodiment described above, or may be carried out separately from the first embodiment to the third embodiment described above.

Figure 15:
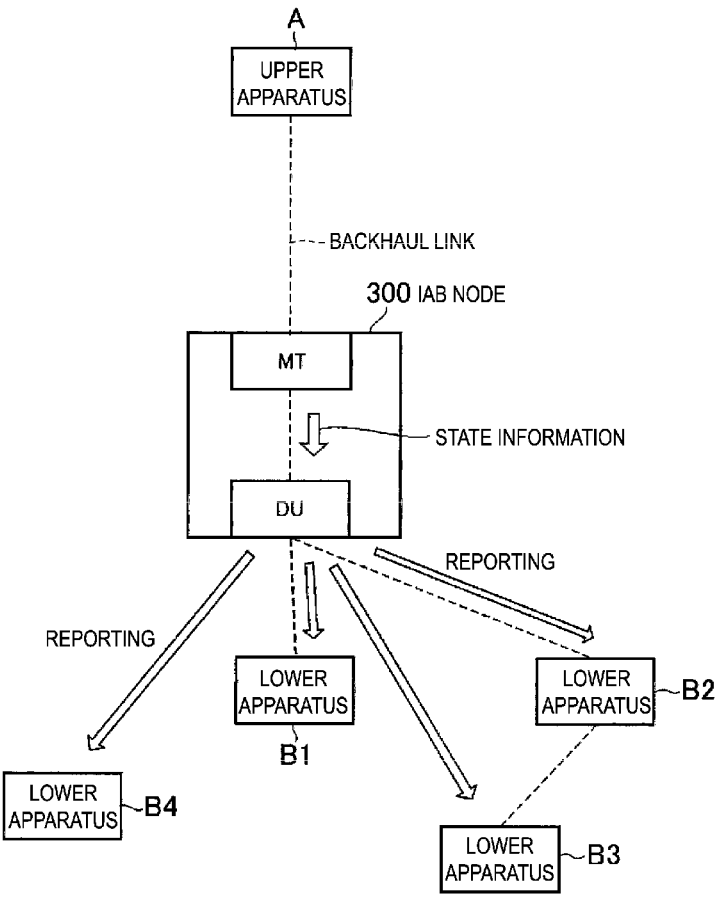
FIG. 15 is a diagram illustrating operation of an IAB node according to a fourth embodiment.

FIG. 15 is a diagram illustrating operation of the IAB node 300 according to the fourth embodiment.

As illustrated in FIG. 15, the IAB node 300 is connected to an upper apparatus A via the backhaul link by radio. The upper apparatus A is an upper IAB node or a donor gNB (donor apparatus).

Lower apparatuses B1 and B2 are connected to the IAB node 300, and a lower apparatus B3 is connected to the lower apparatus B2. A lower apparatus B4 is an apparatus that is not under control of the IAB node 300. The lower apparatuses B1 to B4 are each a lower IAB node or UE. Unless the lower apparatuses B1 to B4 are particularly distinguished from each other, the lower apparatuses B1 to B4 are hereinafter simply referred to as "lower apparatus B".

In the fourth embodiment, in the IAB node 300 that relays communication between the upper apparatus A and the lower apparatus B by radio, the user equipment function unit (MT) connected to the upper apparatus A by radio reports state information to the base station function unit (DU) connected to the lower apparatus B by radio.

The state information is information indicating at least one state of an RRC state of the user equipment function unit (MT) or a radio link state (hereinafter referred to as a backhaul link state) between the upper apparatus A and the user equipment function unit (MT). In this manner, the base station function unit (DU) can control service provision for the lower apparatus B in consideration of the state on the backhaul link side.

Here, the RRC state of the user equipment function unit (MT) is one of "connected", "inactive", and "idle".

The backhaul link state is a state that is based on at least one indicator out of the following 1) to 6), or a combination of these indicators.

1) An RLF state such as "RLF has been detected" and "recovered from the RLF"

2) Radio quality such as Reference Signal Received Power (RSRP)

3) A link state such as the number of times of Radio Link Control (RLC) retransmission and the number of times of RACH (Random Access Channel) retransmission 4) A degree of congestion such as a Received Signal Strength Indicator (RSSI), a Channel Busy Ratio (CBR), and a Listen Before Talk (LBT) state 5) The number of secondary cells being configured or activated, the number of Multiple Input Multiple Output (MIMO) layers, an allocation radio resource state (for example, increase and/or decrease of Configured grants in semi-static allocation, and increase and/or decrease of Dynamic grants in dynamic allocation), communication capacity such as a throughput measured value 6) A measured value of uplink scheduling delay time, and a delay state such as a data amount of an uplink buffer.

The backhaul link state may be how satisfactory the backhaul link state is on the basis of the indicators of 1) to 6) described above, and may be, for example, a state of being more satisfactory than a threshold or being poorer than the threshold.

The user equipment function unit (MT) may report the state information to the base station function unit (DU), with a trigger of a change of the RRC state or a change of the backhaul link state. For example, when an event in which the backhaul link state has satisfied a threshold condition has occurred, the user equipment function unit (MT) reports the state information to the base station function unit (DU).

Alternatively, the user equipment function unit (MT) may periodically report the state information to the base station function unit (DU).

The base station function unit (DU) may stop service provision for the lower apparatus B, based on the state information from the user equipment function unit (MT). To stop service provision for the lower apparatus B means to stop transmission of at least one downlink radio signal. The base station function unit (DU) may stop transmission of a Primary Synchronization Signal (PSS), a Secondary Synchronization Signal (PSS), or a Master Information Block (MIB).

For example, when the user equipment function unit (MT) has transitioned to the RRC idle state or the RRC inactive state, the base station function unit (DU) may stop service provision for the lower apparatus B. When the user equipment function unit (MT) has transitioned to the RRC connected state, the base station function unit (DU) may restart service provision for the lower apparatus B.

When the backhaul link is deteriorated, for example, when the RLF is detected in the backhaul, the base station function unit (DU) may stop service provision for the lower apparatus B. When the backhaul link improves, the base station function unit (DU) may restart service provision for the lower apparatus B.

Alternatively, the base station function unit (DU) may control radio resource allocation (scheduling) for the lower apparatus B, based on the state information from the user equipment function unit (MT).

When the user equipment function unit (MT) has transitioned to the RRC idle state or the RRC inactive state, the base station function unit (DU) may stop resource allocation for the lower apparatus B. Note that, when the user equipment function unit (MT) has transitioned to the RRC idle state or the RRC inactive state, the base station function unit (DU) may be allocating uplink resources to the lower apparatus B. In this case, the base station function unit (DU) may request the user equipment function unit (MT) to transition to the RRC connected state.

When the user equipment function unit (MT) has transitioned to the RRC connected state, the base station function unit (DU) may restart resource allocation for the lower apparatus B.

When the backhaul link is deteriorated, for example, when the RLF is detected in the backhaul, the base station function unit (DU) may stop resource allocation for the lower apparatus B. When the backhaul link is improved, for example, when recovery is made from the RLF in the backhaul, the base station function unit (DU) may restart resource allocation for the lower apparatus B.

Alternatively, the base station function unit (DU) may transmit, to the lower apparatus B, an indication indicating deterioration of the backhaul link, for example, an indication (hereinafter referred to as an RLF notification) indicating RLF occurrence of the backhaul link, based on the state information from the user equipment function unit (MT). The RLF notification may include an identifier of the IAB node 300. The following will describe an example in which the indication indicating deterioration of the backhaul link is the RLF notification.

The base station function unit (DU) may transmit the RLF notification by using a control signal of a layer that is lower than the RRC layer. This is because the base station function unit (DU) does not have RRC connection with the lower apparatus B. Although the control signal of a layer that is lower than the RRC layer is a MAC Control Element (CE), an RLC Control Protocol Data Unit (PDU), or a Physical Downlink Control Channel (PDCCH), the following will describe an example in which the MAC CE is used.

The base station function unit (DU) may transmit the RLF notification to the lower apparatus B by unicast. Alternatively, the base station function unit (DU) may transmit the RLF notification by broadcast or multicast, in order to reduce the signaling load of the RLF notification. When the broadcast or the multicast is used, the lower apparatuses B3 and B4 monitor not only the RLF notification from a connected cell (upper IAB node) but also the RLF notifications of other cells, and can thereby receive the RLF notification from the IAB node 300.

For example, the base station function unit (DU) may transmit the RLF notification by broadcast by using a fixed Radio Network Temporary Identifier (RNTI) that is determined in a specification in advance. The base station function unit (DU) may transmit the RLF notification by multicast by using a common RNTI that is allocated to a group of lower apparatuses.

Note that the broadcast/multicast and the unicast may be separately used as appropriate. In this case, the base station function unit (DU) may report (broadcast) whether the RLF notification is transmitted by broadcast/multicast or is transmitted by unicast by using the SIB. Based on the SIB, the lower apparatus B may change a standby mode of the RLF notification, for example, the RNTI to be used for monitoring of the RLF notification.

The base station function unit (DU) may periodically transmit the RLF notification during the period in which the radio link state of the backhaul link is deteriorated, for example, during the period in which the RLF of the backhaul link occurs. In this case, during the period in which the RLF notification is periodically transmitted, the RLF occurs. Alternatively, the base station function unit (DU) may transmit the RLF notification when the RLF of the backhaul link occurs, and may transmit an indication indicating recovery when recovery is made from the RLF of the backhaul link. The following will mainly describe an example in which occurrence of the RLF of the backhaul link and recovery from the RLF are indicated for the lower apparatus through periodic transmission of the RLF notification.

The lower apparatus B determines that the RLF of the backhaul link occurs during the period in which the lower apparatus B receives the RLF notification from the IAB node 300. The transmission period of the RLF notification may be configured from the donor apparatus to the base station function unit (DU) via the user equipment function unit (MT) of the IAB node 300.

When the RLF notification is transmitted by multicast, the lower apparatus B that has received the RLF notification may start transmission of ACK/NACK feedback for the IAB node 300, in response to reception of the RLF notification. When the IAB node 300 receives an ACK from all of the lower apparatuses B1 to B3 under control of the IAB node 300, the IAB node 300 may stop the periodic transmission of the RLF notification.

The lower apparatuses B1 to B3 that have received the RLF notification may perform processing for switching a connection destination or a communication path from the IAB node 300. Examples of the processing include connection reestablishment processing, conditional handover trigger processing, communication path switch processing, and measurement report processing for handover. Note that when the lower apparatuses B1 to B3 no longer receive the RLF notification from the IAB node 300 (or receive an indication indicating recovery of the backhaul RLF) after starting the switch processing as described above and before completing the switch processing, the lower apparatuses B1 to B3 determine that the backhaul link of the IAB node 300 has been recovered, and may stop the switch processing.

For example, the lower apparatuses B1 to B3 that have received the RLF notification perform cell search of searching for a cell other than the cell of the IAB node 300, and perform connection reestablishment (RRC Reestablishment) for an appropriate cell. Here, even when the RLF does not occur between the lower apparatuses B1 to B3 and the IAB node 300, the connection reestablishment processing as described above is performed at an early stage.

The connection reestablishment processing may be controlled to be executed in a temporally distributed manner. For example, the lower apparatuses B1 to B3 each determine execution start time of the connection reestablishment processing with the use of a random value or a UE-ID, so that the execution start time of the connection reestablishment processing of each of the lower apparatuses B1 to B3 can be made different, which can thereby prevent concentration of the load. Note that, when the RLF notification is transmitted by unicast, with the base station function unit (DU) making transmission timing of each RLF notification different, the execution start time of the connection reestablishment processing of each of the lower apparatuses B1 to B3 may be made different.

When the lower apparatuses B1 to B3 that have received the RLF notification perform DC communication by connecting to the IAB node 300 and an upper apparatus other than the IAB node 300, the lower apparatuses B1 to B3 may switch the communication path via the IAB node 300 to another upper apparatus, or may transmit the RLF notification to another communication apparatus. For example, when the lower apparatus B configures the IAB node 300 as a master node (MN), and configures another upper apparatus as a secondary node (SN) for backup, the lower apparatus B switches the communication path via the MN to the SN.

When conditional handover is configured for the lower apparatuses B1 to B3 that have received the RLF notification, the lower apparatuses B1 to B3 may determine that the condition has been satisfied, and perform handover. When the handover condition is an event indicating radio quality deterioration of the serving cell, handover may be forcibly triggered by modifying radio quality measurement results of the serving cell to be low (for example, regarding as −200 dBm).

The lower apparatuses B1 to B3 that have received the RLF notification may trigger transmission of a measurement report. Here, a general measurement report is transmitted by using an RRC message; however, the base station function unit (DU) does not include an RRC layer. Thus, the IAB node 300 may store the measurement report from the lower apparatus B until recovery is made from the RLF of the backhaul link, and transfer the measurement report to the donor apparatus when recovery is (temporarily) made from the RLF of the backhaul link, and the donor apparatus may cause the lower apparatus B to perform handover.

The lower apparatus B4 that has received the RLF notification may perform processing for excluding the IAB node 300 from candidates of the connection destination. For example, in the cell reselection operation in the RRC idle state or the RRC inactive state, the lower apparatus B4 that has received the RLF notification lowers priority of the cell of the IAB node 300, excludes the cell of the IAB node 300 from a reselection target, or adjusts a received power measured value regarding the IAB node 300 to be low. In this manner, the IAB node 300 may be excluded from candidates of the connection destination. Here, in order to adjust the received power measured value to be low, an offset value may be applied to an actual received power measured value. The offset value may be a fixed value that is determined in advance. Alternatively, the offset value may be a value reported from a network, and this may be reported using broadcast information (SIB) of a cell on which the lower apparatus B4 currently camps.

The lower apparatus B4 may perform the processing for excluding the IAB node 300 from the candidates of the connection destination at timing before starting RRC Setup Request processing or RRC Resume Request processing in the case of transitioning to the RRC connected state.

Specifically, before transmitting the RRC Setup Request, the lower apparatus B4 confirms whether or not a cell of a transmission destination candidate reports the RLF notification. When the cell of the transmission destination candidate does not report the RLF notification, the lower apparatus B4 transmits the RRC Setup Request. When the cell of the transmission destination candidate reports the RLF notification, an appropriate RRC Setup Request transmission destination is selected by stopping (or cancelling) transmission of the RRC Setup Request and performing the cell reselection operation.

When the lower apparatus B4 no longer receives the RLF notification from the IAB node 300 (or receives an indication indicating recovery of the backhaul RLF), the lower apparatus B4 determines that the backhaul link of the IAB node 300 has been recovered, and may stop the processing for excluding the IAB node 300 from the candidates of the connection destination.

Figure 16:
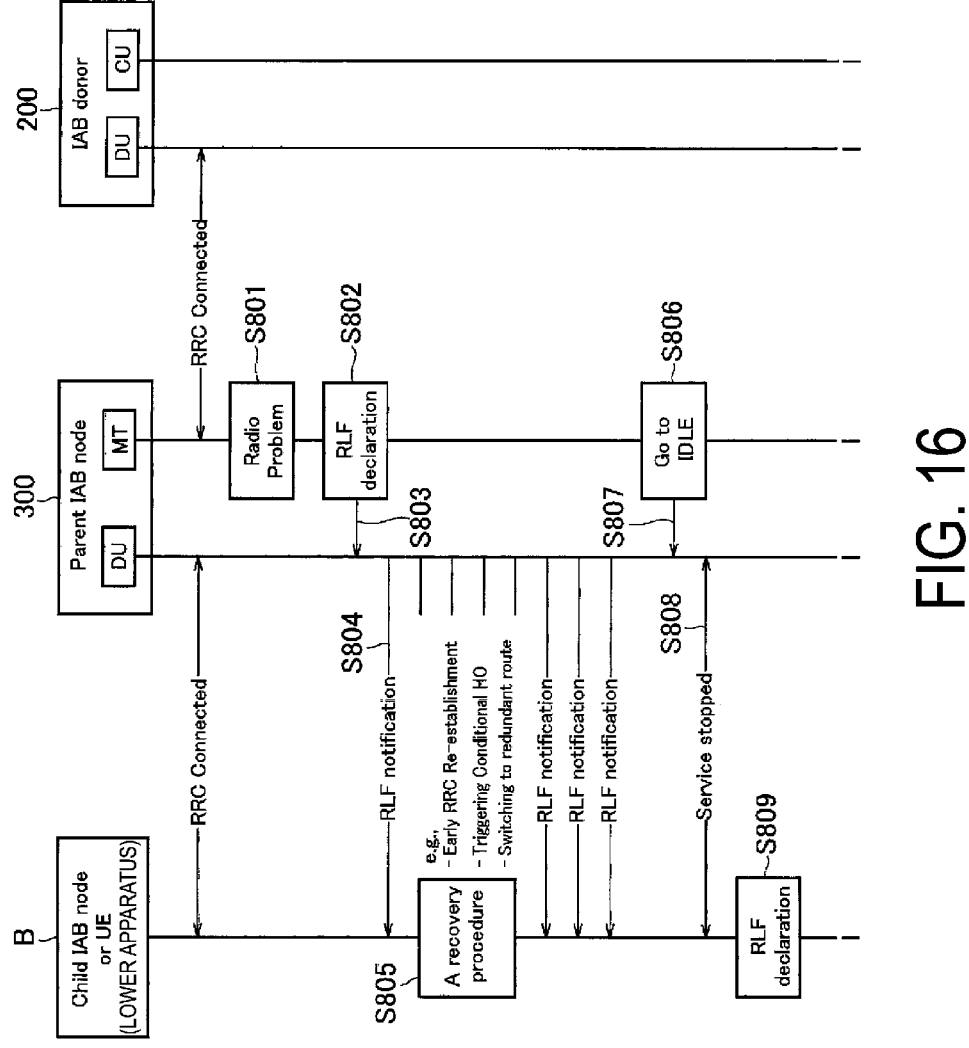
FIG. 16 is a diagram illustrating an example of operation according to the fourth embodiment.

FIG. 16 is a diagram illustrating an example of operation according to the fourth embodiment. In FIG. 16, another IAB node may be interposed between the IAB node (Parent IAB node) 300 and the donor gNB (IAB donor) 200.

As illustrated in FIG. 16, in Step S801, the user equipment function unit (MT) of the IAB node 300 detects a radio problem.

In Step S802, the user equipment function unit (MT) of the IAB node 300 detects an RLF (RLF declaration).

In Step S803, the user equipment function unit (MT) of the IAB node 300 reports state information indicating occurrence of the RLF to the base station function unit (DU) of the IAB node 300.

In Step S804, the base station function unit (DU) of the IAB node 300 starts periodic transmission of the RLF notification, in response to the reporting from the user equipment function unit (MT).

In Step S805, the lower apparatus B that has received the RLF notification starts processing for switching a connection destination or a communication path from the IAB node 300. Examples of the processing include connection reestablishment processing (Early RRC Re-establishment), conditional handover trigger processing (Triggering Conditional HO), and communication path switch processing (Switching to redundant route).

In Step S806, for example, the user equipment function unit (MT) of the IAB node 300 fails to perform connection reestablishment while T310 is running, and transitions to the RRC idle state in response to expiration of T310 (Go to IDLE).

In Step S807, the user equipment function unit (MT) of the IAB node 300 reports state information indicating the transition to the RRC idle state to the base station function unit (DU) of the IAB node 300.

In Step S808, the base station function unit (DU) of the IAB node 300 stops service provision for the lower apparatus B, in response to the reporting from the user equipment function unit (MT) (Service stopped).

In Step S809, in response to the stopping of the service provision from the IAB node 300, the lower apparatus B detects the RLF.

OTHER EMBODIMENTS

In the embodiments described above, an example has been mainly described, in which the mobile communication system 1 is a 5G mobile communication system. However, the base station in the mobile communication system 1 may be an eNB. The core network in the mobile communication system 1 may be an Evolved Packet Core (EPC). In addition, the gNB can also be connected to the EPC, the eNB can also be connected to the 5GC, and the gNB and the eNB can also be connected via an inter-base station interface (Xn interface, X2 interface).

Note that a program that causes a computer to execute each of the processing operations according to the embodiments described above may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chip set including a memory that stores a program for executing each of the processing operations performed by the UE 100 and the eNB 200 and a processor that executes the program stored in the memory may be provided.

Note that the flows illustrated in each figure may be combined as appropriate.

Supplementary Note 1

1. Introduction

A new work item related to integrated access and backhaul has been approved. The WID defines, as one of the purposes thereof, specifying backhaul radio link failure (BH RLF) processing.

Specification of IAB Node Following Architecture 1a Including Following

[ . . . ]

Hop-by-hop propagation of signaling for supporting low latency scheduling, BH RLF processing, and resource adjustment of the entire multi-hop topology.

[ . . . ]

Specification of Signaling of L2 Transport and Resource Management

[ . . . ]

Specification of BH RLF processing (example: downstream BH RLF indication)

In the supplementary note, the first consideration of the BH RLF processing will be discussed in addition to results from the research item.

2. Discussion

TR identifies the problem caused by the BH RLF in the radio backhaul of multi-hop in sections 9.7.14 and 9.7.15. The common problem in the sections is that the child IAB node/UE does not recognize the BH RLF in the parent IAB node. With this, the BH RLF may frequently occur in the radio backhaul of a high frequency such as FR2 and multi-hopping. As a result, service including delay of recovery of the service is significantly interrupted from the perspective of a user.

In order to avoid such a poor user experience as above, TR also identifies possible solutions as below.

9.7.14 Downstream Indication of BH RLF in Architecture 1a

"Option 1: An IAB node DU stops service. As a result, the child node also determines the BH RLF, and recovers according to the procedure described above."

"Option 2: An IAB node DU explicitly warns the child IAB node about an upstream RLF. The child IAB node that has received the warning may transfer the warning to the further downstream side. Each IAB node that has received such warning starts BH-RLF recovery described above."

"Option 3: All of the IAB nodes may periodically share information related to BH quality and the like with a child or parent IAB node. In this manner, downstream or upstream RLF may be detected without executing explicit operation."

9.7.15 Efficient Recovery of Backhaul Link Failure

"Information related to the backhaul failure, which includes a list of nodes that cannot function as a parent node due to the backhaul failure may be provided to a downstream IAB node." (Option 4)

"Preparation of an alternative backhaul link and route in advance (in other words, before occurrence of RLF)" (Option 5)

2.1. IAB Node Stops Service (Option 1)

In Option 1, BH RLF information is implicitly propagated to the child IAB node and the UE, and thus, Option 1 may be regarded as a general solution for the common problem in sections 9.7.14 and 9.7.15. In consideration of influence of the BH RLF not only on the child IAB node but also on the UE (that is connected to the parent IAB node facing the BH RLF), it is anticipated that Option 1 depends on an existing RLF and recovery mechanism, and thus it is an important aspect that Option 1 is supported in the Rel-15 UE. In contrast, in other options, the function of Rel-16 shall be required. In order to minimize interruption of the service also in a case of the Rel-15 UE, Option 1 ought to be specified as a baseline solution for the problem of the BH RLF.

Proposition 1: RAN2 ought to agree to Option 1, in other words, the IAB node stops service with the BH RLF, and that Option 1 is also effective for the Rel-15 UE and is a baseline solution.

According to the description of Option 1, the solution ought to facilitate "the child node also determines the BH RLF". Technically, the MT of the child IAB node and the UE ought to declare the RLF when "service" is interrupted. A simple solution is that the parent IAB node with the BH RLF stops transmission of the PSS, the SSS, the MIB, and the SIB1. With this, the radio problem of the child IAB node and the UE is intentionally created.

Proposition 2: RAN2 ought to agree that the IAB node stops transmission of the PSS, the SSS, the MIB, and the SIB1 when stopping of "service" is determined.

When the agreement to Proposition 2 can be made, it is ought to be precisely defined when the signals are stopped. It can be roughly understood from TR that it is in BH RLF; however, what the BH RLF is and when "service" stops are unclear. Clearly, the BH RLF may be regarded as an RLF between the MT of the IAB node and the DU of the IAB donor (for example, the DU of the parent IAB node). It may be understood in totally the same manner as in the case where the existing RLF between the UE and the gNB is used. Thus, the BH RLF is modeled as the RLF in the radio backhaul link.

Proposition 3: RAN2 ought to agree reuse of the existing RLF mechanism for the BH RLF.

When the agreement to Proposition 3 can be made, even after the current UE operation declares the RLF, in other words, RRC connection is maintained for starting RRC reestablishment, and thus whether or not service actually needs to be stopped in the RLF is unsure. When the UE normally reestablishes RRC connection, the service recovers with minimum interruption time. Thus, it can be understood that, when the MT enters RRC IDLE, in other words, only when RRC reestablishment fails, the IAB node ought to stop "service".

Proposition 4: RAN2 ought to agree that the DU of the IAB node stops "service" when the MT enters RRC IDLE, not when the MT declares the RLF.

As described above, Option 1 is a basis for covering every type of case and device including the Rel-15 UE, and does not represent the best solution in terms of prompt recovery of service and the like. Accordingly, there are a large number of other functions that are to be defined in the WI, and thus other options are still beneficial in addition to Option 1, and may be discussed as long as time allows.

Observation 1: In addition to Option 1, other options are still beneficial in further enhancing service quality.

2.2. IAB Node Reports to Downstream Node (Option 2, Option 4)

In order to facilitate the child IAB node promptly and/or efficiently starting the recovery procedure, it is helpful that the parent IAB node reports information related to the BH RLF to the child IAB node. TR captures a possible information element such as "the child IAB node is explicitly warned about an upstream RLF" (Option 2), or information "related to the backhaul failure including a list of nodes that cannot function as a parent node" (Option 4).

Note that, when the BH RLF occurs in the parent IAB node, a method of providing the child IAB node with such information is unclear. The research item concludes "RAN-3 recommends Architecture 1a in a future normative phase". This indicates that the IAB node includes the DU and the MT, and the IAB donor includes (the DU and) the CU. The CU takes charge of the RRC between the DU and the CU, and the BH RLF is detected in the RRC of the MT. Thus, there are two different RRCs that ought to be taken into consideration. The RRC on the MT of the parent IAB node detects the BH RLF, and different RRC of the IAB donor generates an RRC message to be transmitted to the child IAB node.

In consideration of disconnection of a physical radio link due to the BH RLF, information to the downstream node cannot be transmitted using the RRC message. In other words, the RRC message generated by the CU cannot reach the DU due to the BH RLF. "Warning" (of Option 2) may be transmitted using the MAC CE or the like, but "list of nodes" (of Option 4) is excessively large and flexible, unless the RRC message is used. Thus, when Option 2 and/or Option 4 is introduced, RAN2 ought to examine which signaling is used first.

Observation 2: The physical radio link to the CU is disconnected, and thus the DU of the IAB node need not use the RRC message.

It is obvious that the information is provided as the function of Rel-16. In other words, it may be supported only between the IAB nodes. In other words, it is not supported in the Rel-15 UE.

Observation 3: Option 2 and Option 4 function only in the recovery procedure of the Rel-16 IAB node.

2.3. All IAB Nodes Periodically Share Information (Option 3)

In Option 3, the IAB node can detect the BH RLF, based on shared information. The information captured in TR is, for example, "BH quality". This may be existing GNB-DU STATUS INDICATION of F1, or may be new signaling between the DUs.

Observation 4: Option 3 may be out of the range of RAN2.

2.4. Advance Preparation of Alternative Link (Option 5)

Option 5 may aim to use, for example, multi-connectivity (with MN/SN role change), conditional handover, other technology related to normal topology adaptation or mobility enhancement. As TR states "additional function/enhanced function defined as a part of the WI of other Rel-16 may be utilized", Option 5 may reuse results discussed in the WI or other topics of other WI.

Observation 5: Option 5 may reuse a solution discussed in the WI or other topics of other WI.

Supplementary Note 2

1. Introduction

A new work item of integrated access and backhaul is approved in RAN #82, and low latency scheduling of a multi-hop radio backhaul is considered to be identified.

Specification of IAB Node Following Architecture 1a

[ . . . ]

Hop-by-hop propagation of signaling for supporting low latency scheduling, BH RLF processing, and resource adjustment in the entire multi-hop topology.

In the Contribution, a solution to the low latency scheduling will be discussed.

2. Discussion

Figure 17:
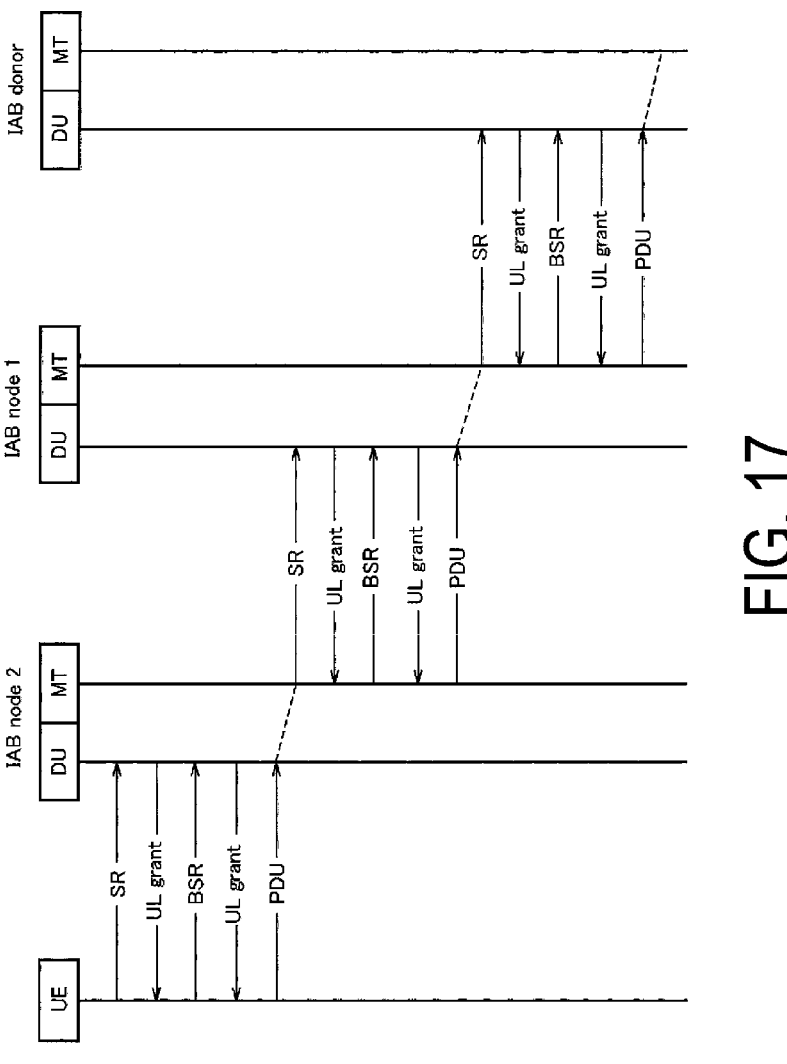
FIG. 17 is a diagram related to a supplementary note.

The research item identifies the problem of latency in UL scheduling due to a sequence procedure of the multi-hop backhaul as illustrated in FIG. 17 captured in section 8.6 of TR 38.87.

TR further identifies conceivable mechanisms, such as "One approach for reducing such delay is configured by starting an uplink resource request with the IAB node, based on data that is expected to arrive. With this, the IAB node can acquire uplink resources before receiving actual data from the child IAB node or the UE to which it provides service." and "The details of the SR/BSR and UL scheduling and the details of the trigger are left for the WI phase.".

Prior to giving details, because the solutions slightly differ depending on preconditions, whether enhancement is required for dynamic allocation, is required for a configured grant, or is required for the both ought to be made clear. The description of TR described above may intend to use dynamic resource allocation, the problem of latency may not be a problem for the configured grant, and depending on the case, there is a problem in spectral efficiency. Thus, RAN2 ought to enhance the SR, the BSR, and/or the UL scheduling for the dynamic resource allocation.

Proposition 1: RAN2 ought to enhance the SR, the BSR, and/or the UL scheduling for the dynamic resource allocation in the multi-hop radio backhaul.

In the current specification, the SR is triggered when there are no normal resources for BSR transmission as follows.
MAC Entity 1> When it is determined that at least one BSR is triggered in a buffer status report procedure and is not cancelled

[ . . . ]

2> When a regular BSR is triggered, and logicalChannelSR-DelayTimer is not executed 3> When there are no UL-SCH resources available for new transmission, or 3> When the MAC entity is configured with the configured uplink grant and the regular BSR is triggered for a logical channel for which logicalChannelSR-Mask is configured to be false, or 3> When the UL-SCH resources available for new transmission do not satisfy the restriction (see 5.4.3.1) of LCP mapping configured for the logical channel that has triggered the BSR, 4> The scheduling request is triggered Thus, one of important problems is a method of increasing the speed of triggering the regular BSR. The regular BSR is triggered when data becomes transmittable as follows.

The MAC entity determines the amount of UL data available in the logical channel according to a data amount calculation procedure of TS 38.322 and 38.323.

The BSR is triggered when any of the following events occurs.

The UL data of the logical channel belonging to an LCG becomes available in the MAC entity.

The UL data belongs to a logical channel that has priority higher than the priority of a logical channel including available UL data belonging to any LCG. Alternatively, In the logical channel belonging to the LCG, available UL data is not included.

In this case, the BSR is referred to as a "regular BSR".

To enable "early regular BSR trigger", configuring an additional rule to transmittable data is simple. At present, the calculation procedure of the data amount as described above is performed only in the RLC and PDCP layers; however, the MAC entity of the MT of the backhaul link ought to take the UL data amount indicated in the DU into consideration in some way.

Proposition 2: RAN2 ought to agree that the MAC entity of the MT needs to take the UL data amount visible in the DU of the same IAB node into consideration.

When the agreement to Proposition 2 can be made, which of the data amounts visible in the DU is regarded as transmission capable of using data ought to be studied. The following options are considered.

Option 1: Actual data amount in a buffer in the MAC, the RLC, and the PDCP of a DU protocol stack (and the adaptation layer, depending on the case).

Figure 18:
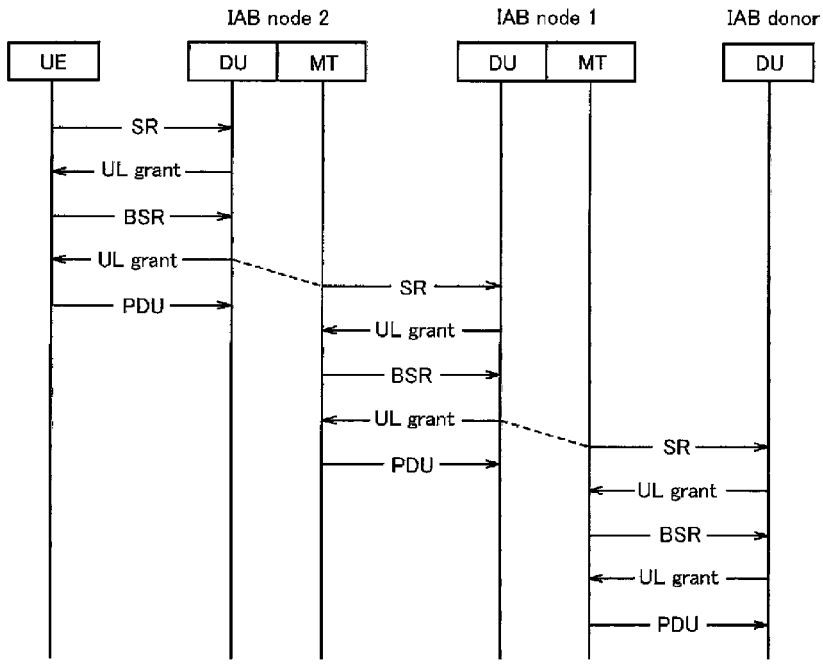
FIG. 18 is a diagram related to a supplementary note.

Option 2: In addition to Option 1, data amount already granted to the child node/UE (FIG. 18).

Option 3: In addition to Option 2, data available for transmission of the child node/UE, in other words, a buffer size of the BSR from the child node/UE (FIG. 14).

From the viewpoint of latency reduction, Option 3 is an optimal solution, because when the DU of the IAB node receives UL data from the child node/UE, it can be expected that the MT of the IAB node grants resources in the backhaul link. In contrast, unless reception of the UL grant in the MT and reception of the UL data in the DU are sufficiently synchronized, a waste of resources may occur. In other words, over scheduling may occur. Option 1 has a low risk, but also has a low benefit. Option 2 is regarded as a balanced solution between among other options.

Proposition 3: RAN2 ought to discuss whether additional data available for transmission is a data amount related to the UL grant to the UE or the BSR from the UE.

Supplementary Note 3

1. Introduction

A new work item related to integrated access and backhaul has been approved. The WID defines, as one of the purposes thereof, specifying backhaul radio link failure (BH RLF) processing.

Specification of IAB Node Following Architecture 1a Including Following

[ . . . ]

Hop-by-hop propagation of signaling for supporting low latency scheduling, BH RLF processing, and resource adjustment of the entire multi-hop topology.

[ . . . ]

Specification of Signaling of L2 Transport and Resource Management

[ . . . ]

Specification of BH RLF processing (example: downstream BH RLF indication)

In the supplementary note, the first consideration of the BH RLF processing will be discussed in addition to results from the research item.

2. Discussion 2.1. Background

TR identifies the problem caused by the BH RLF in the radio backhaul of multi-hop in sections 9.7.14 and 9.7.15. The common problem in the sections is that the child IAB node/UE does not recognize the BH RLF in the parent IAB node. With this, the BH RLF may frequently occur in the radio backhaul of a high frequency such as FR2 and multi-hopping. As a result, service including delay of recovery of the service is significantly interrupted from the perspective of a user.

In order to avoid such a poor user experience as above, TR also identifies possible solutions as below.

9.7.14 Downstream Indication of BH RLF in Architecture 1a

"Option 1: An IAB node DU stops service. As a result, the child node also determines the BH RLF, and recovers according to the procedure described above."

"Option 2: An IAB node DU explicitly warns the child IAB node about an upstream RLF. The child IAB node that has received the warning may transfer the warning to the further downstream side. Each IAB node that has received such warning starts BH-RLF recovery described above."

"Option 3: All of the IAB nodes may periodically share information related to BH quality and the like with a child or parent IAB node. In this manner, downstream or upstream RLF may be detected without executing explicit operation."

9.7.15 Efficient Recovery of Backhaul Link Failure

"Information related to the backhaul failure, which includes a list of nodes that cannot function as a parent node due to the backhaul failure may be provided to a downstream IAB node." (Option 4)

"Preparation of an alternative backhaul link and route in advance (in other words, before occurrence of RLF)" (Option 5)

R2 assumes that there is an RLF indication in the BH Link RLF to at least a downstream node.

An alternative link and/or dual connectivity (if agreed) may be used at the time of recovery in case of a failure in the BH Link.

The current UE RLF detection and recovery are reused as a baseline.

For example, when the link is recovered, or when recovery is ongoing, whether or not another indication is needed requires further study.

These agreements are based on Options 2, 4, and 5 described above, and an additional aspect is also included.

2.2. IAB Node Stops Service (Option 1)

In Option 1, BH RLF information is implicitly propagated to the child IAB node and the UE, and thus, Option 1 may be regarded as a general solution for the common problem in sections 9.7.14 and 9.7.15. Although the agreed "RLF indication" is a function of Rel-16, the Rel-15 UE is still permitted to connect to the IAB node. In order to minimize interruption of the service also in a case of the Rel-15 UE, Option 1 ought to be specified as a baseline solution for the problem of the BH RLF.

Observation 1: The agreed "RLF indication" cannot solve the problem of the BH RLF from the viewpoint of the Rel-15 UE.

According to the description of Option 1, the solution ought to facilitate "the child node also determines the BH RLF". A simple solution is that the parent IAB node with the BH RLF stops transmission of the PSS, the SSS, the MIB, and the SIB1. With this, the radio problem of the child IAB node and the UE is intentionally created.

Proposition 1: RAN2 ought to agree that the IAB node stops transmission of the PSS, the SSS, the MIB, and the SIB1 when stopping of "service" is determined.

When the agreement to Proposition 1 can be made, RAN2 already assumes "RLF indication in BH Link RLF", and further, even after the current UE operation declares the RLF, in other words, RRC connection is maintained for starting RRC reestablishment, whether or not service actually needs to be stopped in the RLF is unsure. When the UE normally reestablishes RRC connection, the service recovers with minimum interruption time. Thus, it can be understood that, when the MT enters RRC IDLE, in other words, only when RRC reestablishment fails, the IAB node ought to stop "service". In this sense, it is natural that the MT reports, to the DU (of the same IAB node), entering into RRC IDLE (there is a possibility of transitioning to RRC Connected in a setup stage).

Proposition 2: RAN2 ought to agree that the DU of the IAB node stops "service" when the MT enters RRC IDLE, not when the MT declares the RLF.

Proposition 3: When the agreement to Proposition 2 can be made, RAN2 further discusses whether or not the MT needs to report to the DU (of the same IAB node) when the MT enters RRC IDLE.

2.3. IAB Node Reports to Downstream Node (Option 2, Option 4)

In order to facilitate the child IAB node promptly and/or efficiently starting the recovery procedure, it is helpful that the parent IAB node reports information related to the BH RLF to the child IAB node. TR captures a possible information element such as "the child IAB node is explicitly warned about an upstream RLF" (Option 2), or information "related to the backhaul failure including a list of nodes that cannot function as a parent node" (Option 4). In addition, RAN2 agrees to the baseline that "R2 assumes that there is an RLF indication in the BH Link RLF to at least a downstream node".

Note that, when the BH RLF occurs in the parent IAB node, a method of providing the child IAB node with such information is unclear. The research item concludes "RAN-3 recommends Architecture 1a in a future normative phase". This indicates that the IAB node includes the DU and the MT, and the IAB donor includes (the DU and) the CU. The CU takes charge of the RRC between the DU and the CU, and the BH RLF is detected in the RRC of the MT. Thus, there are two different RRCs that ought to be taken into consideration. The RRC on the MT of the parent IAB node detects the BH RLF, and different RRC of the IAB donor generates an RRC message to be transmitted to the child IAB node.

In consideration of disconnection of a physical radio link due to the BH RLF, information to the downstream node cannot be transmitted using the RRC message. In other words, the RRC message generated by the CU cannot reach the DU due to the BH RLF. "Warning" (of Option 2) may be transmitted using the MAC CE, but the MAC CE is not appropriate for transmitting "list of nodes" (of Option 4). Thus, RAN2 ought to assume Option 2 with the MAC CE, and not consider Option 4.

Observation 2: The physical radio link to the CU is disconnected, and thus the DU of the IAB node need not use the RRC message.

Proposition 4: RAN2 ought to discuss whether the RLF indication to the downstream node is transmitted via the MAC CE.

When/how the RLF indication is triggered will also be discussed. In view of the name of information, it is straightforward that the RLF indication is transmitted when the BH RLF is declared in the MT. In this case, the DU needs to generate/transmit the RLF indication according to the BH RLF, and thus the MT ought to report RLF declaration to the DU (of the same IAB node). When the agreement to Proposition 2 of the previous section can be made, in a case of the BH RLF, in other words, that the IAB node only transmits the RLF indication, "service" continues, and when the MT enters RRC IDLE, "service" stops.

Proposition 5: RAN2 ought to agree to the DU transmitting the RLF indication when the RLF is reported from the MT.

Another problem is MT operation (of the child IAB node) at the time of reception of the RLF indication. It can be assumed that the MT starts a certain recovery procedure; however, it ought to be a process "before" the MT declares the RLF. In other words, the RLF indication ought not to immediately trigger the RLF of the child node. This is because, due to the declaration of the RLF, the RLF indication to the downstream node is further triggered, and the RLF indication is propagated among IAB topologies in no time. Unnecessary streams of topology adaptation may be generated, and in the worst case, the IAB topologies may be damaged.

Proposition 6: RAN2 ought to agree to the MT/UE not declaring the RLF at the time of reception of the RLF indication, and only starting recovery of a certain backhaul link.

RAN2 agrees to "R2 assumes that there is an RLF indication in the BH Link RLF to at least a downlink node". In this manner, it is natural that the "downstream node" means a child node/UE directly connected to the parent node. Note that whether or not grandchild the node/UE not directly connected to the parent (in other words, the parent may be a grandparent from the viewpoint of the grandchild) is also included in the "downstream node" is not clear.

When the grandchild can receive the RLF indication, propagation delay of the RLF indication is eliminated, and thus there is an advantage that recovery of the topology is expedited. In addition, as a spin-off, when any IDLE node/ UE can receive the RLF indication, this may be considered in a case of reselection. With this, the node/UE cannot connect to a donor node, and thus even when a rank of the cell is the highest, avoidance of reselection or connection of the cell in which the BH RLF occurs can be attempted. The disadvantage is that adaptation and management of the topology become complicated. For example, in an extreme case, when all of the nodes and/or pieces of UEs in the IAB topology receive the RLF indication from one node and start the recovery procedure, a large number of unnecessary topology changes may be performed, and in the worst case, the IAB topology may be damaged. Thus, whether or not only the child node receives the RLF indication ought to be studied in consideration of the advantage and the disadvantage described above.

Proposition 7: RAN2 ought to clarify whether only the child node receives the RLF indication or the grandchild node also receives the RLF indication.

In the previous conference, RAN2 defines "for example, when the link is recovered, or when recovery is ongoing, whether or not another indication is needed requires further study".

From the viewpoint of the child IAB node or the UE, when the RLF indication is received, a certain topology adaptation procedure, for example, RRC reestablishment to another IAB node or switching of a primary path to a redundant route, is started. In this sense, the information that "the link (of the backhaul) is recovered" is, when the topology adaptation procedure is completed, for example, when an appropriate cell cannot be found in the RRC reestablishment procedure, beneficial because the procedure can be stopped. Note that, when the RLF indication is repeatedly transmitted during the BH RLF, any "another indication" need not be defined. This is because, when the RLF indication is not transmitted, this means that the BH RLF does not occur. Otherwise, "service" stops. Thus, the problem is whether or not the RLF indication is repeatedly transmitted during the BH RLF.

Proposition 8: RAN2 ought to discuss whether or not the RLF indication is repeatedly transmitted during the BH RLF.

Regarding another example, in other words, "recovery is ongoing", operation of the child node/UE is unclear. When causing the child node/UE to stand by for a while is meant, no indication (even the RLF indication) to the downstream node may not be required. Thus, there is no reason for introduction at this time point.

2.4. All IAB Nodes Periodically Share Information (Option 3)

In Option 3, the IAB node can detect the BH RLF, based on shared information. The information captured in TR is, for example, "BH quality". This may be existing GNB-DU STATUS INDICATION of F1, or may be new signaling between the DUs.

Observation 3: Option 3 may be out of the range of RAN2.

2.5. Advance Preparation of Alternative Link (Option 5)

Option 5 may aim to use, for example, multi-connectivity (with MN/SN role change), conditional handover, other technology related to normal topology adaptation or mobility enhancement. As TR states "additional function/enhanced function defined as a part of the WI of other Rel-16 may be utilized", Option 5 may reuse results discussed in the WI or other topics of other WI. Only the influence specific to the IAB (if there is any) will be discussed later, such as whether the RLF indication triggers specific operation such as "MCG Failure Indication".

Observation 4: Option 5 may reuse a solution discussed in the WI or other topics of other WI.

The invention claimed is:

1. A method used in a first Integrated Access and Backhaul (IAB) node, the method comprising:

receiving from a network, by the first IAB node, configuration information configuring conditional handover to the first IAB node, the conditional handover being a handover to be executed by the first IAB node in response to a trigger condition being satisfied;

receiving, by the first IAB node, from a second IAB node which connects to the first IAB node as an upper apparatus of the first IAB node and connects to a third IAB node as a lower apparatus of the third IAB node, a Radio Link Failure (RLF) notification indicating deterioration of a radio link between the second IAB node and the third IAB node, wherein the RLF notification is a control signal of a layer lower than a Radio Resource Control (RRC) layer; and executing, by the first IAB node, the conditional handover from the second IAB node to another IAB node, in response to the reception of the RLF notification, wherein the trigger condition is an event indicating radio quality deterioration of a serving cell of the first IAB node, the serving cell being managed by the second IAB node, and the executing the conditional handover comprises executing the configured conditional handover in response to the reception of the RLF notification without transmitting measurement report from the first IAB node.

2. A first Integrated Access and Backhaul (IAB) node comprising:

a processor and a memory, the processor configured to receive from a network, configuration information configuring conditional handover to the first IAB node, the conditional handover being a handover to be executed by the first IAB node in response to a trigger condition being satisfied, receive from a second IAB node which connects to the first IAB node as an upper apparatus of the first IAB node and connects to a third IAB node as a lower apparatus of the third IAB node, a Radio Link Failure (RLF) notification indicating deterioration of a radio link between the second IAB node and the third IAB node wherein the RLF notification is a control signal of a layer lower than a Radio Resource Control (RRC) layer, and execute the conditional handover from the second IAB node to another IAB node, in response to the reception of the RLF notification, wherein the trigger condition is an event indicating radio quality deterioration of a serving cell of the first IAB node, the serving cell being managed by the second IAB node, and the processor is configured to execute the configured conditional handover in response to the reception of the RLF notification without transmitting measurement report from the first IAB node.

3. A chipset for controlling a first Integrated Access and Backhaul (IAB) node, the chipset comprising:

a processor and a memory, the processor configured to receive from a network, configuration information configuring conditional handover to the first IAB node, the conditional handover being a handover to be executed by the first IAB node in response to a trigger condition being satisfied, receive from a second IAB node which connects to the first IAB node as an upper apparatus of the first IAB node and connects to a third IAB node as a lower apparatus of the third IAB node, a Radio Link Failure (RLF) notification indicating deterioration of a radio link between the second IAB node and the third IAB node, wherein the RLF notification is a control signal of a layer lower than a Radio Resource Control (RRC) layer, and execute the conditional handover from the second IAB node to another IAB node in response to the reception of the RLF notification, wherein the trigger condition is an event indicating radio quality deterioration of a serving cell of the first IAB node, the serving cell being managed by the second IAB node, and the processor is configured to execute the configured conditional handover in response to the reception of the RLE notification without transmitting measurement report from the first IAB node.

4. A non-transitory computer-readable medium comprising, stored thereupon, computer program instructions for execution by a first Integrated Access and Backhaul (IAB) node, the computer program instructions being configured to cause the first IAB node to execute processing of:

receiving from a network, configuration information configuring conditional handover to the first IAB node, the conditional handover being a handover to be executed by the first IAB node in response to a trigger condition being satisfied, receiving from a second IAB node which connects to the first IAB node as an upper apparatus of the first IAB node and connects to a third IAB node as a lower apparatus of the third IAB node, a Radio Link Failure (RLF) notification indicating deterioration of a radio link between the second IAB node and the third IAB node, wherein the RLF notification is a control signal of a layer lower than a Radio Resource Control (RRC) layer; and executing the conditional handover from the second IAB node to another IAB node in response to the reception of the RLF notification, wherein the trigger condition is an event indicating radio quality deterioration of a serving cell of the first IAB node, the serving cell being managed by the second IAB node, and the executing the conditional handover comprises executing the configured conditional handover in response to the reception of the RLE notification without transmitting measurement report from the first IAB node.

5. A system comprising:

a first Integrated Access and Backhaul (IAB) node, wherein the first IAB node is configured to:

receive from a network, configuration information configuring conditional handover to the first IAB node, the conditional handover being a handover to be executed by the first IAB node in response to a trigger condition being satisfied, receive from a second IAB node which connects to the first IAB node as an upper apparatus of the first IAB node and connects to a third IAB node as a lower apparatus of the third IAB node, a Radio Link Failure (RLF) notification indicating deterioration of a radio link between the second IAB node and the third IAB node, wherein the RLF notification is a control signal of a layer lower than a Radio Resource Control (RRC) layer, and execute the conditional handover from the second IAB node to another IAB node in response to the reception of the RLF notification, wherein the trigger condition is an event indicating radio quality deterioration of a serving cell of the first IAB node, the serving cell being managed by the second IAB node, and the first IAB node is configured to execute the configured conditional handover in response to the reception of the RLE notification without transmitting measurement report from the first IAB node.

6. The method according to claim 1, wherein executing the conditional handover comprises executing the configured conditional handover in response to the reception of the notification, even if the configured trigger condition is not satisfied.

* * * * *